United States Patent
Komatani et al.

(10) Patent No.: US 9,418,707 B2
(45) Date of Patent: Aug. 16, 2016

(54) ACCOMMODATING CASE FOR PORTABLE RECORDING MEDIUM

(75) Inventors: Shinjiro Komatani, Tokyo (JP); Nobuyuki Takahashi, Tokyo (JP); Toru Kuronuma, Kanagawa (JP); Akio Takizawa, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 398 days.

(21) Appl. No.: 13/981,221

(22) PCT Filed: Aug. 5, 2011

(86) PCT No.: PCT/JP2011/067964
§ 371 (c)(1),
(2), (4) Date: Jul. 23, 2013

(87) PCT Pub. No.: WO2012/101851
PCT Pub. Date: Aug. 2, 2012

(65) Prior Publication Data
US 2013/0299369 A1    Nov. 14, 2013

(30) Foreign Application Priority Data
Jan. 26, 2011    (JP) .................................. 2011-014326

(51) Int. Cl.
*B65D 85/57* (2006.01)
*G11B 33/02* (2006.01)
*G11B 33/04* (2006.01)

(52) U.S. Cl.
CPC .......... *G11B 33/025* (2013.01); *G11B 33/0416* (2013.01)

(58) Field of Classification Search
CPC .......................... G11B 33/025; G11B 33/0416
USPC ....................... 206/303, 307, 308.1, 309–313
See application file for complete search history.

(56) References Cited

U.S. PATENT DOCUMENTS

| | | | |
|---|---|---|---|
| 5,526,926 A | 6/1996 | Deja | |
| 5,533,615 A * | 7/1996 | McCamy | G11B 33/0422 |
| | | | 206/308.1 |
| 5,690,218 A * | 11/1997 | McCamy | G11B 33/0422 |
| | | | 206/303 |

(Continued)

FOREIGN PATENT DOCUMENTS

| CN | 1100226 A | 3/1995 |
|---|---|---|
| CN | 2447910 Y | 9/2001 |

(Continued)

*Primary Examiner* — Luan K Bui
(74) *Attorney, Agent, or Firm* — Matthew B. Dernier, Esq.

(57) ABSTRACT

An accommodating case from which a user can easily detach a recording medium is provided. An accommodating case includes an inner surface thereof with a medium disposition area that is an area to dispose the recording medium. In addition, the accommodating case includes an engagement plate portion for engaging with edges of the recording medium so that the recording medium disposed in the medium disposition area is prevented from separating from the inner surface thereof. Furthermore, the accommodating case includes a movable plate portion defining a part of the inner surface thereof. The movable plate portion is movable relative the other portion of the inner surface of the accommodating case to be recessed toward the outside of the accommodating case. The movable plate portion is located over the medium disposition area and an outside area of the medium disposition area.

13 Claims, 16 Drawing Sheets

(56) References Cited

U.S. PATENT DOCUMENTS

| | | | | |
|---|---|---|---|---|
| 6,164,446 | A * | 12/2000 | Law | G11B 33/0427 206/308.1 |
| 6,892,878 | B2 * | 5/2005 | Hegarty | G11B 33/0427 206/308.1 |
| 7,188,723 | B2 * | 3/2007 | Foerster | G11B 33/0427 206/308.1 |
| 7,753,200 | B2 | 7/2010 | Goto | |
| 2002/0033348 | A1 * | 3/2002 | Flores, Jr. | G11B 33/0427 206/308.1 |
| 2002/0100701 | A1 * | 8/2002 | Chiu | G11B 33/0422 206/308.1 |
| 2002/0139701 | A1 * | 10/2002 | Luckow | G11B 33/0422 206/308.1 |
| 2004/0139461 | A1 * | 7/2004 | Yamagishi | G11B 33/0427 720/728 |
| 2005/0205441 | A1 | 9/2005 | Goto | |
| 2006/0196789 | A1 * | 9/2006 | O'Brien | G11B 33/0422 206/308.1 |
| 2008/0011625 | A1 * | 1/2008 | Gelardi et al. | Y10T 70/5004 206/308.1 |

FOREIGN PATENT DOCUMENTS

| | | |
|---|---|---|
| CN | 2462516 Y | 11/2001 |
| CN | 1950909 A | 4/2007 |
| JP | 07187273 A | 7/1995 |
| JP | 3073269 U | 8/2000 |
| JP | 3079427 U | 8/2001 |
| JP | 2005350140 A | 12/2005 |

* cited by examiner

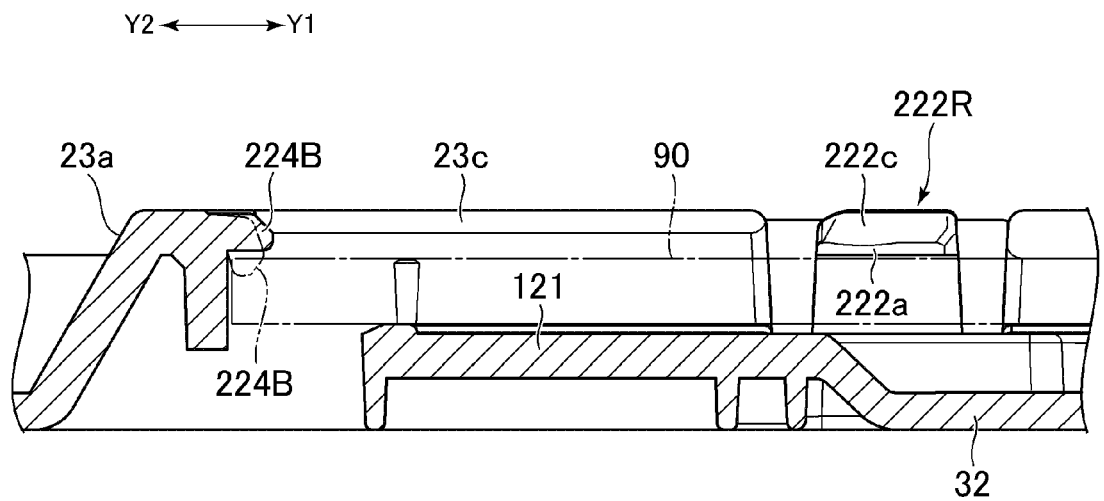
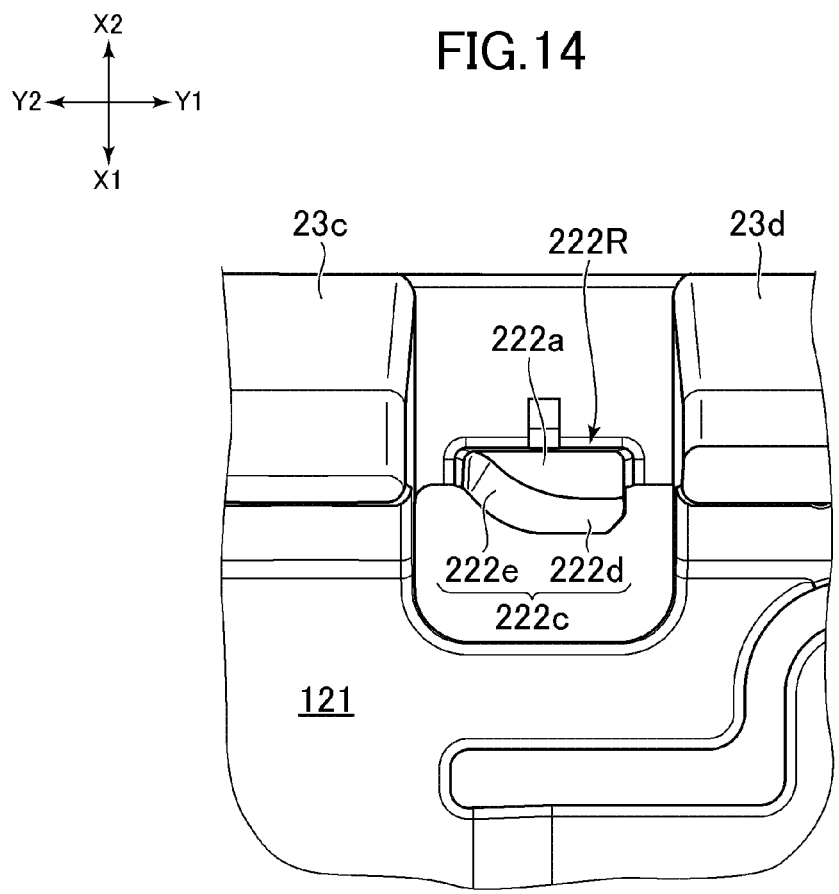

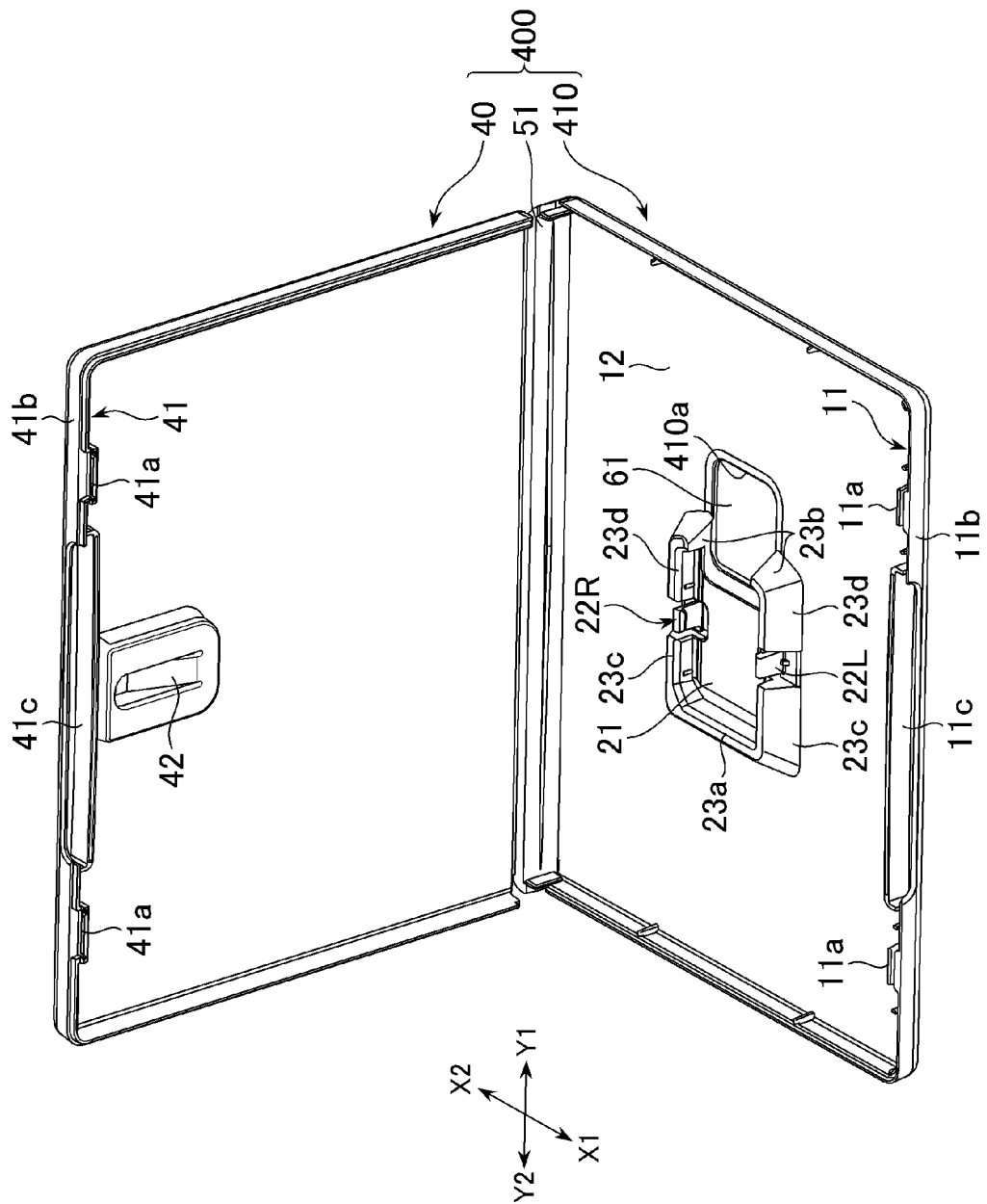

ACCOMMODATING CASE FOR PORTABLE RECORDING MEDIUM

TECHNICAL FIELD

The present invention relates to an accommodating case for accommodating portable recording medium.

BACKGROUND ART

For example, as disclosed in the specification of US 2005/0205441 A, a portable recording medium such as a card type recording medium or a recording medium having an optical disc in a cartridge, is used for an information processing apparatus such as a game apparatus or a personal computer. A case for accommodating the recording medium has a large size compared to the recording medium in order to protect the recording medium. Many of the case has an area (hereinafter, referred to as a medium disposition area) to arrange the recording medium inside thereof and includes a hook portion to be arranged along an edge of the medium disposition area and engage with the recording medium. When the recording medium is detached from the case, users insert their fingertip between the recording medium and an inner surface of the case and then the engagement between the hook portion and the recording medium is released.

SUMMARY OF INVENTION

Since downsizing of the recording medium is advanced in recent years, inserting the fingertip between the recording medium and the inner surface of the case becomes inconvenient.

An object of the invention is to provide an accommodating case for users to easily detach the recording medium.

A accommodating case according to the invention is used for accommodating a portable recording medium. In order to solve the above described problem, the accommodating case includes an inner surface having a medium disposition area that is an area to arrange the recording medium; an engagement portion for engaging with an edge of the recording medium so that the recording medium in the medium disposition area is suppressed from separating from the inner surface; and a movable portion forming a part of the inner surface and movable so as to be recessed toward the outside of the case relative to the other part of the inner surface. The movable portion is located over the medium disposition area and an outside area of the medium disposition area.

According to the invention, the user can easily detach the recording medium from the accommodating case. In addition, the recording medium can be protected by the movable portion.

BRIEF DESCRIPTION OF DRAWINGS

FIG. 13 is a cross-sectional view which is taken along a line XIII-XIII illustrated in FIG. 12.

FIG. 14 is a plan view of a second engagement portion illustrated in FIG. 12.

FIG. 17 is a perspective view of the accommodating case according to a fourth embodiment.

DESCRIPTION OF EMBODIMENTS

Figure 1:
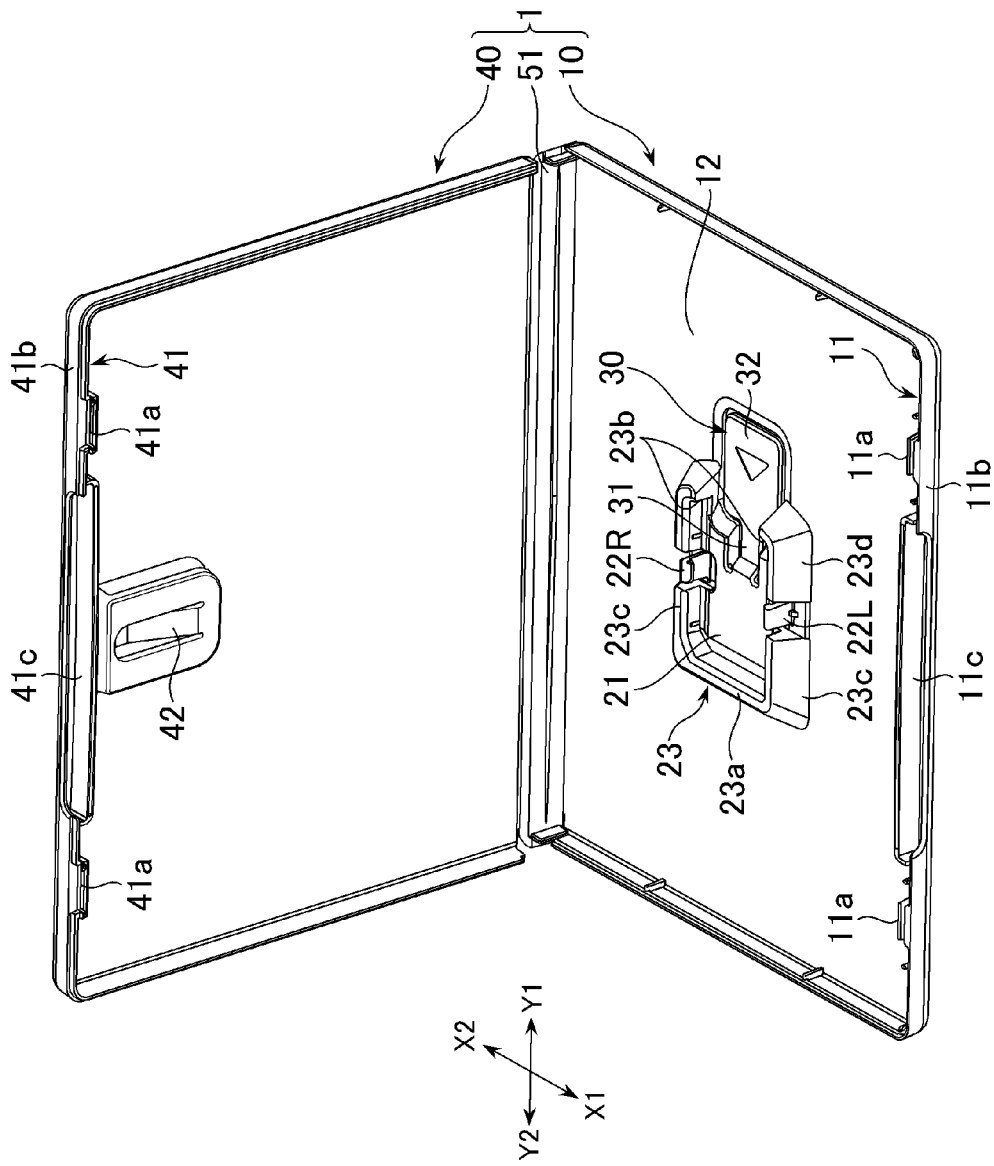
FIG. 1 is a perspective view of an accommodating case according to a first embodiment of the invention. The view illustrates the accommodating case which is open.
Figure 2:
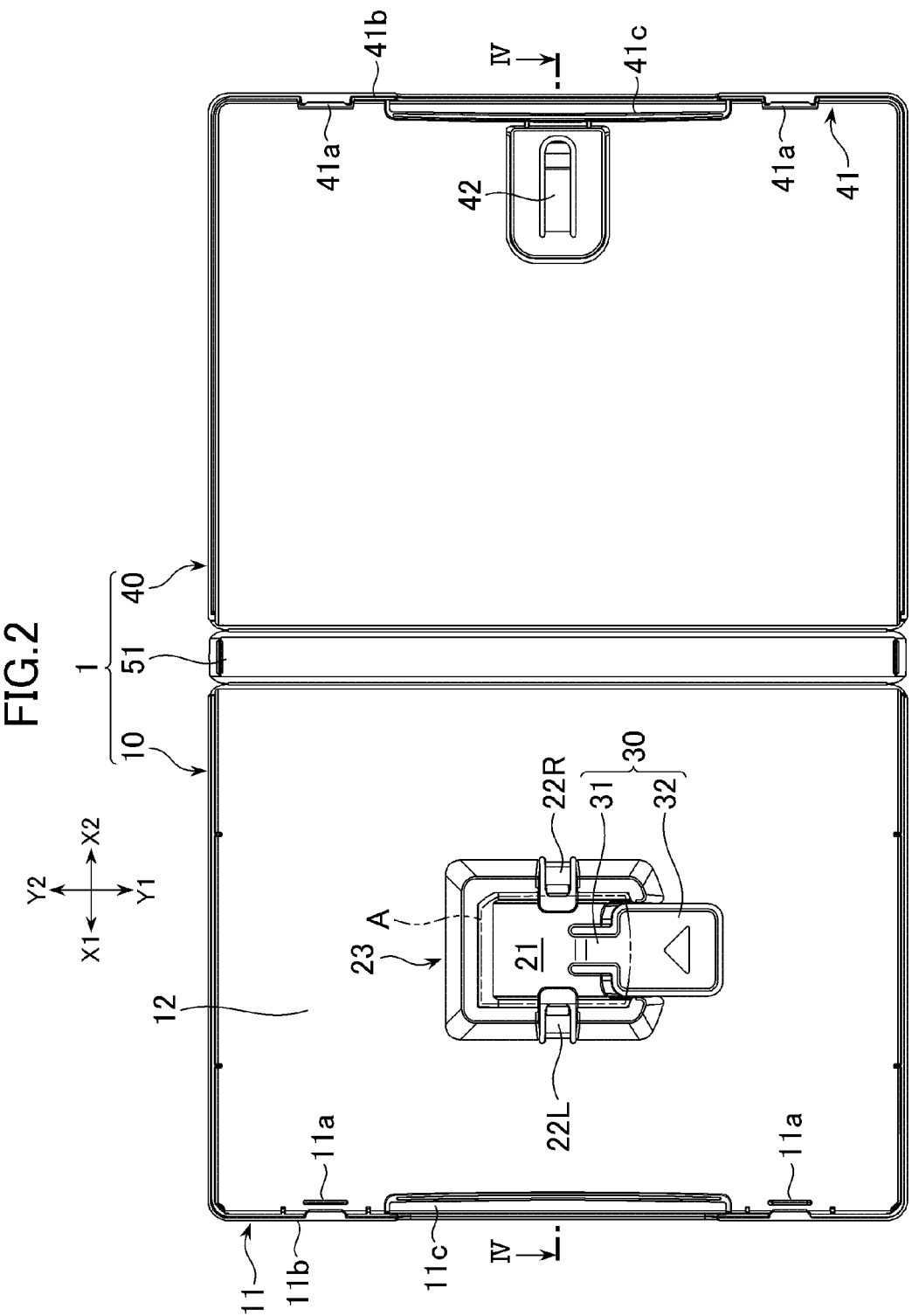
FIG. 2 is a plan view of the accommodating case. The view illustrates the accommodating case which is largely open compared to FIG. 1, and a first panel and a second panel thereof are open 180 degrees.
Figure 3:
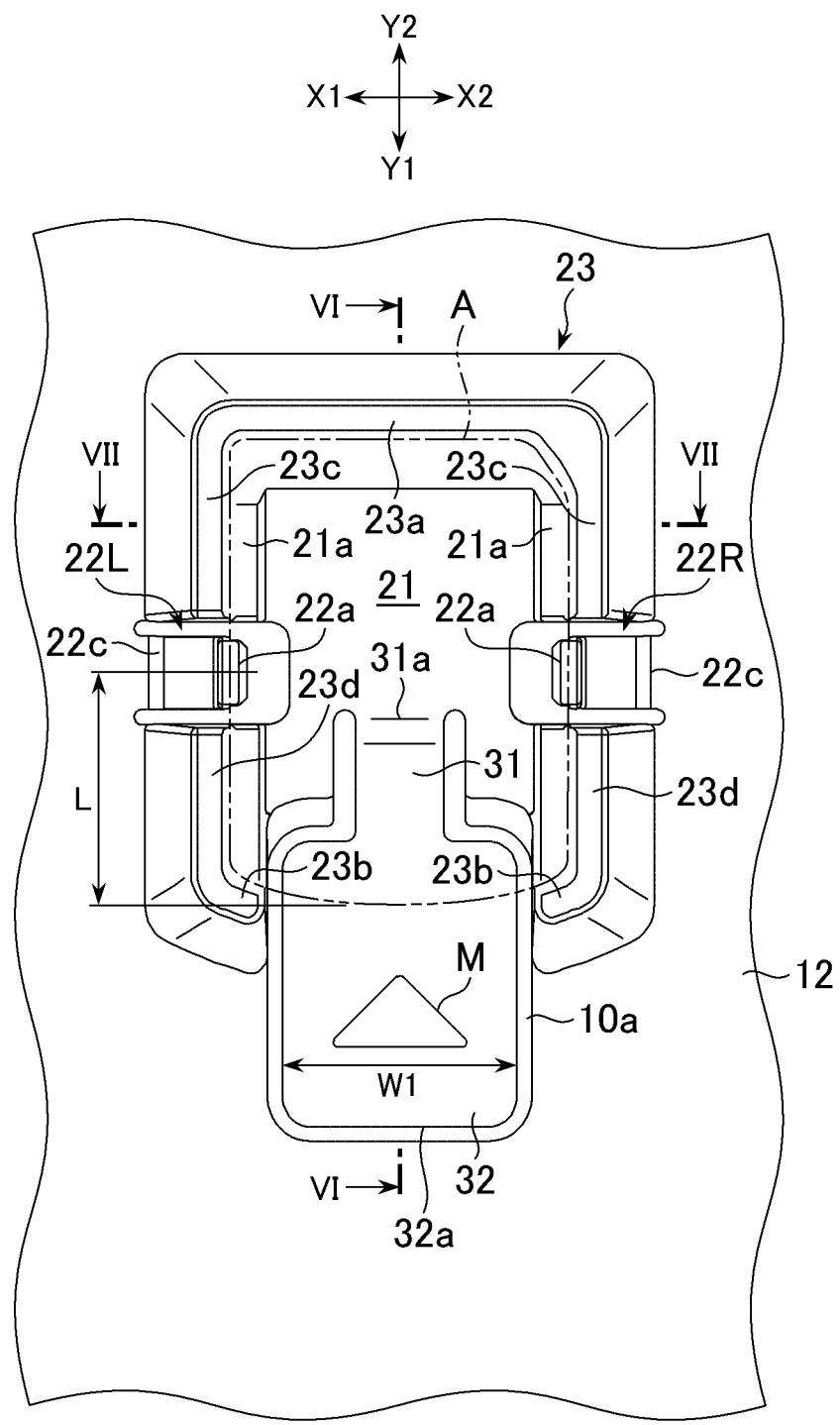
FIG. 3 is an enlarged view of FIG. 2 and enlarges a portion having a medium disposition area.
Figure 4:
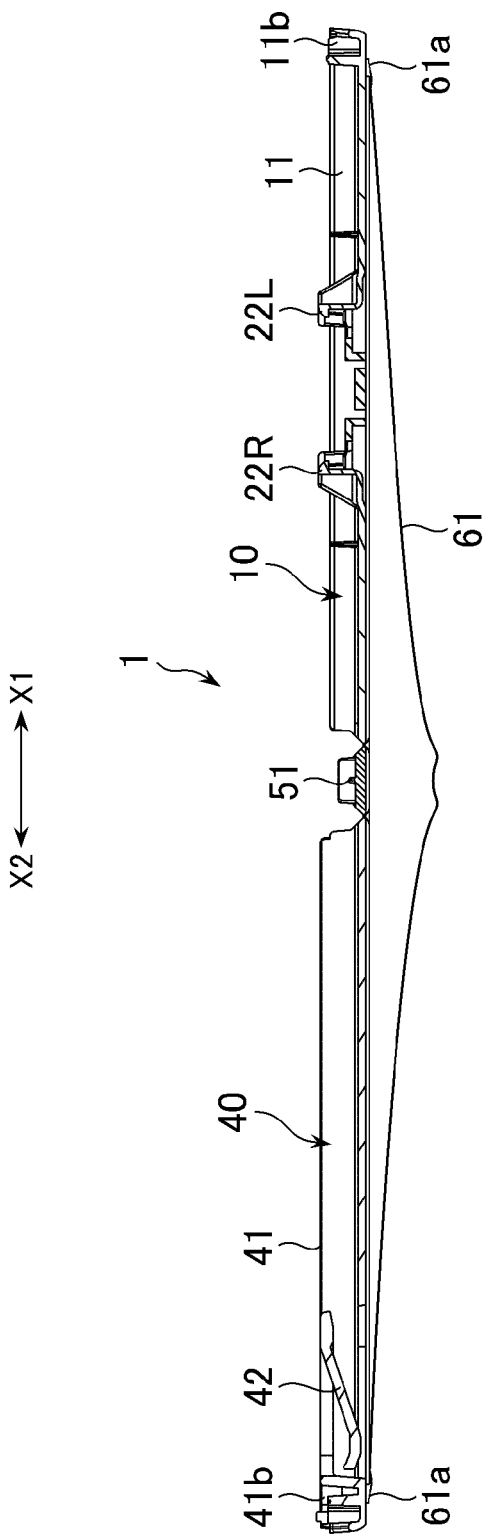
FIG. 4 is a cross-sectional view which is taken along a line IV-IV illustrated in FIG. 2.
Figure 5:
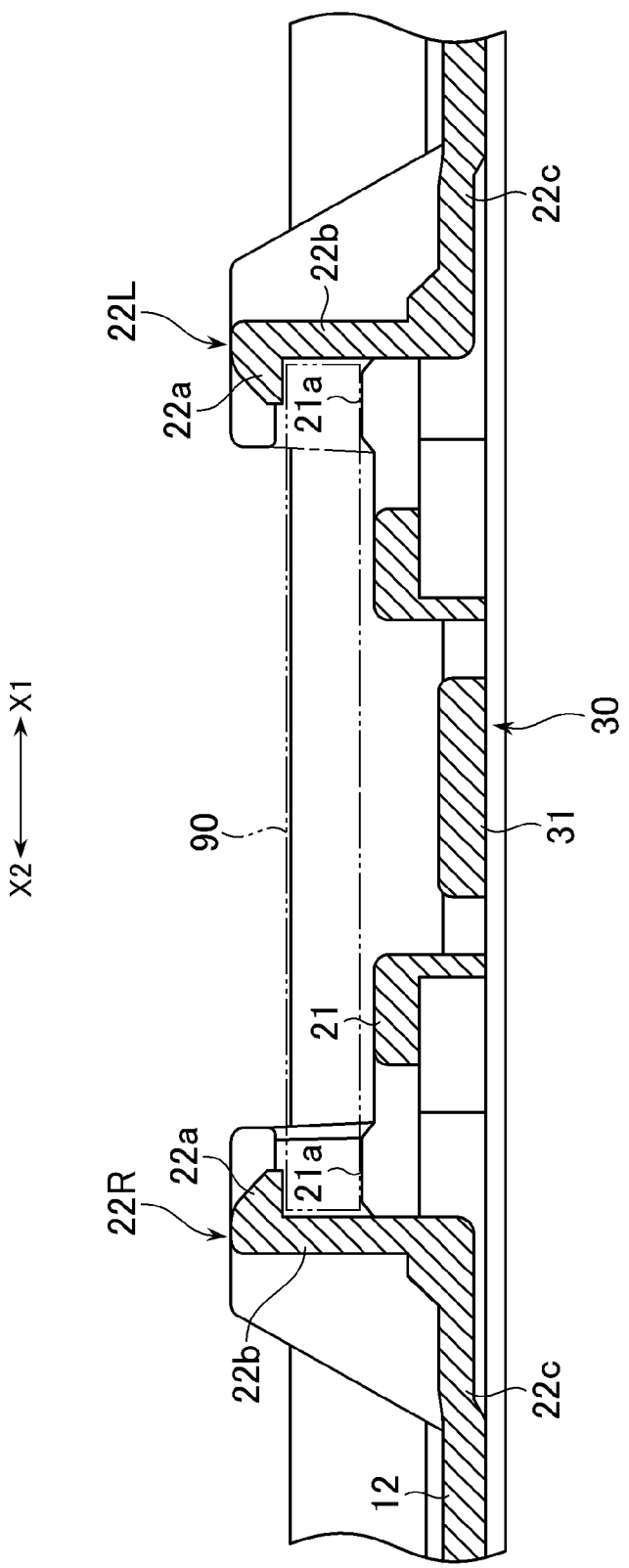
FIG. 5 is an enlarged view of a main portion of FIG. 4.
Figure 6:
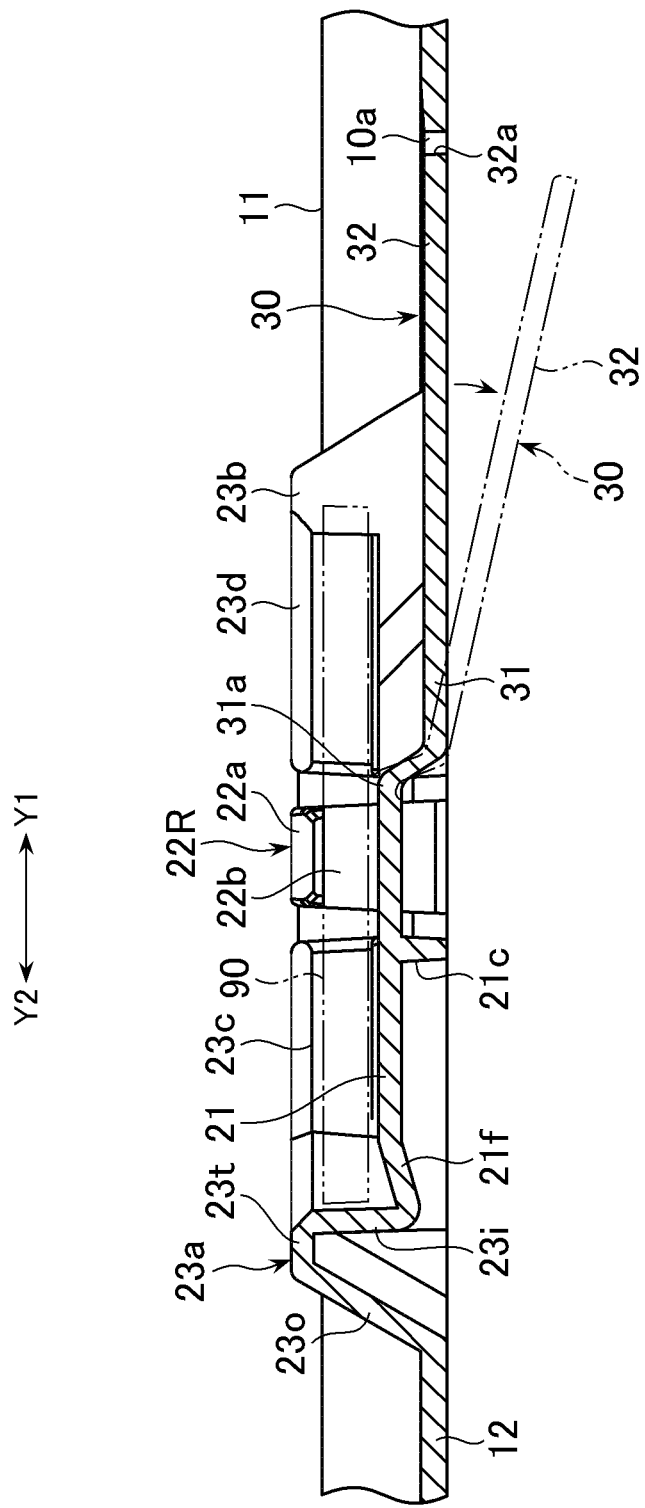
FIG. 6 is a cross-sectional view which is taken along a line VI-VI illustrated in FIG. 3.
Figure 7:
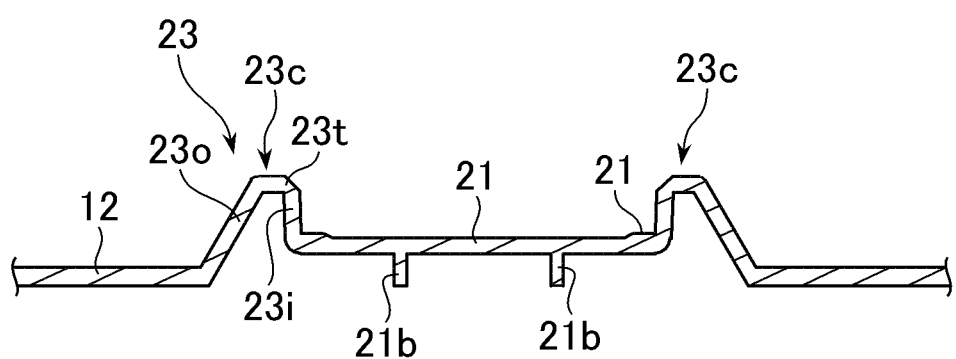
FIG. 7 is an end view of a cutting portion in a line VII-VII illustrated in FIG. 3.
Figure 8:
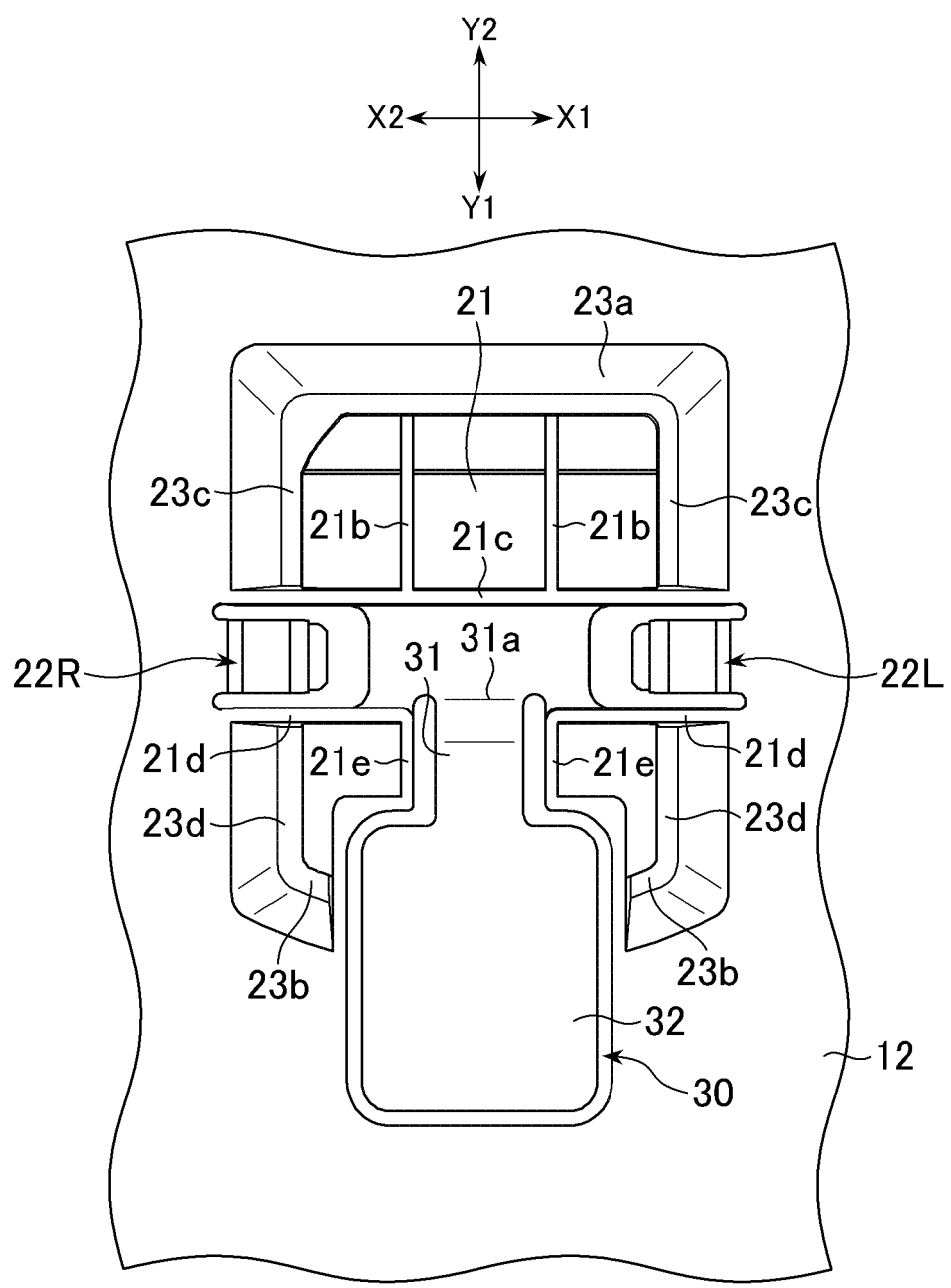
FIG. 8 is a bottom view of a portion having the medium disposition area.

Hereinafter, an embodiment of the invention will be described with reference to the drawings. FIG. 1 is a perspective view of an accommodating case 1 according to a first embodiment of the invention. FIG. 1 illustrates the accommodating case 1 of an open state. FIG. 2 is a plan view of the accommodating case 1 and in the view, a first panel 10 and a second panel 40 are open 180 degrees. FIG. 3 is an enlarged view of FIG. 2 and enlarges a portion having a medium disposition area A described below. FIG. 4 is a cross-sectional view which is taken along a line IV-IV illustrated in FIG. 2. FIG. 5 is an enlarged view of a main portion of FIG. 4. FIG. 6 is a cross-sectional view which is taken along a line VI-VI illustrated in FIG. 3. FIG. 7 is an end view of a cutting portion in a line VII-VII illustrated in FIG. 3. FIG. 8 is a bottom view of a portion having the medium disposition area A of the first panel 10. Hereinafter, an extending direction of a movable plate portion 30 described below is referred to as a front-rear direction (a Y1-Y2 direction illustrated in the views). Further, the orthogonal direction thereto is referred to as a right-left direction (a X1-X2 direction illustrated in the views).

The accommodating case 1 is for accommodating a portable recording medium. A case for a card-type recording medium 90 will be described as an example. The accommodating case 1 in a closed state has a substantially thin rectangular parallelepiped shape. As illustrated in FIG. 1, the accommodating case 1 includes the first panel 10 and the second panel 40 defining outer walls thereof. The second panel 40 faces the first panel 10 in a state where the accommodating case 1 is closed. As described below in detail, an area (an area A illustrated in FIG. 3) in which the recording medium 90 is arranged is provided in the first panel 10. The second panel 40 includes a holder 42 for holding explanatory documents (for example, a guide for a game) about program stored in the recording medium 90.

As illustrated in FIG. 1, the accommodating case 1 further includes a coupling wall 51. The coupling wall 51 is located between the first panel 10 and the second panel 40, and connects edges thereof. The coupling wall 51 defines a side wall of the accommodating case 1 in a state where the first panel 10 and the second panel 40 are closed. In the example, both of the first panel 10 and the second panel 40 are substantially rectangular. The coupling wall 51 connects one side of the first panel 10 and one side of the second panel 40. The first panel 10, the second panel 40 and the coupling wall 51 are integrally formed of plastic.

The first panel 10 includes a frame 11 on an outer peripheral edge thereof to surround the first panel 10. The second panel 40 includes a frame 41 on an outer peripheral edge thereof to surround the second panel 40. The frame 11 and the frame 41 are formed like a wall raised on the edges of the first panel 10 and the second panel 40, respectively. The frame 11 is formed on a part of the outer peripheral edge of the first panel 10, to which the coupling wall 51 is not connected. Similarly, the frame 41 is formed on a portion of the outer peripheral edge of the second panel 40, to which the coupling wall 51 is not connected. The frame 11 and the frame 41 are fitted together in a state where the accommodating case 1 is closed and forms a periphery wall of the accommodating case 1 together with the coupling wall 51. The frame 11 and the frame 41 includes engagement portions 11a and 41a, respectively for engaging with each other. The engagement portions 11a and 41a are provided at the edges facing each other in a state where the accommodating case 1 is closed. The engagement portions 11a and 41a have a function to suppress opening of the accommodating case 1.

As illustrated in FIGS. 1 to 3, an inner surface of the first panel 10 has an area A (an area illustrated in a two-dot chain line in FIG. 3 and hereinafter referred to as the medium disposition area) to arrange the recording medium 90 (see, FIGS. 4 and 5). As illustrated in FIG. 2, the medium disposition area A is provided substantially in the center of the first panel 10. The medium disposition area A has a shape and a size corresponding to an outer shape of the recording medium 90. The medium disposition area A in the present example has a substantially rectangular shape.

The first panel 10 includes a support plate portion 21 on one part thereof. The support plate portion 21 forms an inner portion of the medium disposition area A. The recording medium 90 arranged in the medium disposition area A is supported on the support plate portion 21.

As illustrated in FIGS. 3 and 5, the first panel 10 includes a plurality (two in the example) of engagement portions 22R and 22L. The engagement portions 22R and 22L are located opposite to each other across the medium disposition area A. In the example, the engagement portions 22R and 22L are located to the left and right of the medium disposition area A, respectively.

The engagement portions 22R and 22L can engage with the edge (in the example, the right edge and the left edge of the recording medium 90) of the recording medium 90 so that the recording medium 90 disposed on the medium disposition area A is suppressed from separating from the inner surface (a surface of the support plate portion 21) of the first panel 10. In the example, as illustrated in FIG. 5, the engagement portions 22R and 22L includes hook portions 22a on ends thereof. The hook portions 22a extend to the inside of the medium disposition area A. In addition, the hook portion 22a faces the edge portion of the support plate portion 21 in a direction (in other words, a thickness direction of the recording medium 90) perpendicular to the inner surface of the first panel 10. The edge of the recording medium 90 is pinched between the edge portions of the hook portion 22a and the support plate portion 21. And thus, the recording medium 90 can be suppressed from separating from the support plate portion 21. A clearance between the hook portion 22a and the surface of the support plate portion 21 corresponds to the thickness of the recording medium 90.

The recording medium stored in the accommodating case 1 is not limited to the card-type recording medium. For example, the invention may be applied to a case for storing a recording medium with an optical disc in a cartridge (for example, MiniDisc (MD (Registered Trademark)) or a Universal Media Disc (UMD (Registered Trademark)). In this case, the medium disposition area A corresponds to the outer shape of the cartridge. The engagement portions 22R and 22L are formed so as to engage with the outer edge of the cartridge.

The engagement portions 22R and 22L are elastically deformable when coming into contact with the edge of the recording medium 90. In other words, the engagement portions 22R and 22L can be elastically deformed so that the hook portion 22a is retreated from the medium disposition area A in the right direction or the left direction, respectively. In other words, the engagement portions 22R and 22L can be elastically deformed in a direction in which a distance between two hook portions 22a is expanded and reduced. When the hook portion 22a receives a force from the recording medium 90 in a direction (upward in FIG. 5) in which the recording medium 90 is separated from the support plate portion 21, the hook portion 22a is once retreated from the medium disposition area A. Accordingly, the engagement of the hook portion 22a and the recording medium 90 is released. When the hook portion 22a receives a force from the recording medium 90 in a direction in which the recording medium 90 comes close to the support plate portion 21, the hook portion 22a is once retreated from the medium disposition area A. Accordingly, the hook portion 22a engages with the recording medium 90.

As illustrated in FIG. 2, the first panel 10 includes a base panel 12. The base panel 12 configures a portion on the outside of the medium disposition area A (more particularly, a portion on the outside of the support plate portion 21, the movable plate portion 30 and a peripheral wall 23). As illustrated in FIG. 5, the engagement portions 22R and 22L includes arm portions 22b. The arm portion 22b extends upward from the base panel 12. The arm portion 22b extends toward the medium disposition area A from a base end 22c connected to the base panel 12 and then bends upward to further extends. The hook portion 22a protrudes toward the inside of the medium disposition area A from an upper end of the arm portion 22b. The arm portion 22b can be elastically deformed around the base end 22c so as to open to the outside. Accordingly, the hook portion 22a can be elastically retreated from the medium disposition area A.

As illustrated in FIG. 5, the support plate portion 21 of the present example includes step portions 21a on the edges thereof located opposite to each other (in the present example, a right edge and a left edge). A surface of the step portion 21a is higher than a portion between them. The hook portion 22a faces the step portion 21a in a direction (the thickness direction of the recording medium 90) perpendicular to the inner surface of the first panel 10. The recording medium 90 is pinched between the hook portions 22a of the engagement portions 22R and 22L and the step portions 21a. As described above, the support plate portion 21 includes a portion located higher than the other portion of the support plate portion 21 in a position facing the hook portions 22a of the engagement portions 22R and 22L. Thus, even though the support plate portion 21 is slightly bent due to an external force being applied, the recording medium 90 can be suppressed from separating from the first panel 10. Such a step portion 21a may not be formed in the support plate portion 21. The recording medium 90 may be supported by the entire support plate portion 21.

As illustrated in FIG. 1, the accommodating case 1 includes the movable plate portion 30. The movable plate portion 30 forms a portion of the inner surface of the accommodating case 1. In the present example, the movable plate portion 30 is provided in the first panel 10 having the support plate portion 21. The movable plate portion 30 can elastically move to be recessed toward the outside of the accommodating case 1 relative to the other portion of the inner surface of the first panel 10 (see, FIG. 6). In other words, the movable plate portion 30 can move in a direction (downward in FIG. 6) opposite to the removing direction of the recording medium 90 from the support plate portion 21. As illustrated in FIG. 3, the movable plate portion 30 is located over the medium disposition area A and the outside area of the medium disposition area A. In other words, one part of the movable plate portion 30 is located inside the medium disposition area A and the other part of the movable plate portion 30 is located outside the medium disposition area A. As a result, in a state where the recording medium 90 is disposed in the medium disposition area A, the movable plate portion 30 is located below the edge (the front edge in the example) of the recording medium 90. When a user detaches the recording medium 90 from the first panel 10, a finger can easily be inserted between the movable plate portion 30 and the recording medium 90 by pressing down the movable plate portion 30.

As illustrated in FIG. 3, the movable plate portion 30 is surrounded by a groove 10a passing through the first panel 10 in the thickness direction thereof. The movable plate portion 30 is connected with the other portion of the first panel 10 via an end 31a thereof (an end of an arm portion 31 described below and hereinafter, referred to as a connecting portion, in the example). Thus, the movable plate portion 30 can be elastically inclined toward the outside of and inside the accommodating case 1 around the connecting portion 31a. The finger of the user can be easily inserted between the recording medium 90 and the movable plate portion 30 by inclining the movable plate portion 30 toward the outside of the accommodating case 1. In the present example, the movable plate portion 30 is connected with the support plate portion 21 at the connecting portion 31a.

The movable plate portion 30 extends in a direction orthogonal to a direction in which two engagement portions 22R and 22L face each other. The movable plate portion 30 is arranged beyond one edge of four edges (a front edge, a rear edge, a right edge and a left edge) of the medium disposition area A, which do not have the engagement portions 22R and 22L. The movable plate portion 30 of the present example extends in the front-rear direction and is arranged beyond the front edge of the medium disposition area A.

The connecting portion 31a is located inside the medium disposition area A and as described above, is connected with the support plate portion 21. As illustrated in FIG. 3, the movable plate portion 30 extends from the connecting portion 31a to the outside of the medium disposition area A. An end (a front edge of a plate portion 32 described below) 32a opposite to the connecting portion 31a is located outside the medium disposition area A. As illustrated in FIG. 6, when the movable plate portion 30 is inclined, a moving amount of the connecting portion 31a is small compared to a moving amount of the end 32a. Since the connecting portion 31a is located inside the medium disposition area A, the movable plate portion 30 can be suppressed from pushing up the recording medium 90 when the movable plate portion 30 is pressed from the outside the accommodating case 1.

In addition, providing the connecting portion 31a inside the medium disposition area A can reduce the area occupied by the entire support plate portion 21 and the movable plate portion 30, compared to an embodiment in which the connecting portion 31a is connected with a portion (in the example, the base panel 12) outside the medium disposition area A. In the present example, the whole of the arm portion 31 of the movable plate portion 30 described below is located inside the medium disposition area A.

As illustrated in FIG. 3, in the medium disposition area A, the width in one direction of the front-rear direction and the right-left direction is longer than the width of the other direction. The movable plate portion 30 extends in the one direction from the inside of the medium disposition area A. Thus, the length of the movable plate portion 30 is easily secured. As a result, a force required to push down the movable plate portion 30 can be reduced. In the present example, the width in the front-rear direction is greater than the width in the right-left direction. Thus, the movable plate portion 30 extends from the inside of the medium disposition area A to the front. The width of the medium disposition area A in the right-left direction may be greater than the width of the medium disposition area A in the front-rear direction. In this case, the movable plate portion 30 may extend from the inside the medium disposition area A in the right direction or the left direction.

As illustrated in FIG. 3, a length (in other words, the width of the medium disposition area A in the front-rear direction) of the right and left edges of the medium disposition area A is greater than a length (in other words, the width of the medium disposition area A in the right-left direction) of the front and rear edges of the medium disposition area A. The engagement portions 22R and 22L are provided in the edges having a larger length of the medium disposition area A. Specifically, the engagement portions 22R and 22L are provided in the right and left edges of the medium disposition area A. Thus, sufficient distance L (see, FIG. 3) from the front edge of the medium disposition area A to the engagement portions 22R and 22L can be easily secured. The user pushes up the front edge of the recording medium 90 when removing the recording medium 90. At that time, the right and left edges of the recording medium 90 abut the hook portions 22a of the engagement portions 22R and 22L. Sufficient distance L from the front edge of the medium disposition area A to the engagement portions 22R and 22L increases a force applied on the hook portion 22a from the recording medium 90 is increased, and thus the engagement between the hook portion 22a and the recording medium 90 can be easily released. In the present example, the engagement portions 22R and 22L are provided substantially on the center portion of the right and left edges (the right and left edges of the support plate portion 21) of the medium disposition area A. Thus, it is possible to stably hold the recording medium 90.

As illustrated in FIG. 1, the frame 11 of the first panel 10 and the frame 41 of the second panel 40 have a first wall 11b and a second wall 41b located opposite to each other, respectively across the coupling wall 51. The first wall 11b and the second wall 41b have recesses 11c and 41c for hooking the finger of the user. Therefore, in many cases, the first wall 11b and the second wall 41b are oriented toward the user and then the user opens the first panel 10 and the second panel 40. The movable plate portion 30 extends from the connecting portion 31a in a direction along the extending direction of the first wall 11b. Accordingly, the user can push down easily the movable plate portion 30 with a fingertip of one hand, in a state where the first wall 11b and the second wall 41b are oriented toward the user. In other words, the movable plate portion 30 is easily pushed down compared to an embodiment in which the movable plate portion 30 extends in a direction orthogonal to the extending direction of the first wall 11b.

As illustrated in FIG. 6, a recess into which the edge (in the example, the rear edge) of the recording medium 90 can be fitted is formed in the rearmost portion of the support plate portion 21. The support plate portion 21 of the present example includes an inclined surface 21f at the rearmost portion thereof. The inclined surface 21f is inclined such that the rearmost portion of the support plate portion 21 is recessed. Therefore, the recording medium 90 can be smoothly inclined when the user lifts the front edge of the recording medium 90. In addition, when the user puts the recording medium 90 in the accommodating case 1, the recording medium 90 is obliquely arranged such that the rear portion of the recording medium 90 is along the inclined surface 21f and then the recording medium 90 is laid down toward the support plate portion 21. Thus, the recording medium 90 can engage with the engagement portions 22R and 22L.

As illustrated in FIG. 3, the movable plate portion 30 includes two portions and a width of one portion is greater than a width of the other portion. Then, one part of the portion having greater width is located outside the medium disposition area A. Accordingly, the user can easily push the movable plate portion 30. Particularly, as illustrated in FIG. 3, the movable plate portion 30 includes the arm portion 31 in a portion toward the connecting portion 31a. In addition, the movable plate portion 30 includes the plate portion 32 extending from the arm portion 31. The plate portion 32 has a width (a width in the right-left direction) greater than the arm portion 31. One part of the plate portion 32 is located outside the medium disposition area A. In other words, the plate portion 32 is located over the medium disposition area A and the peripheral area of the medium disposition area A. Thus, the user can easily push down the plate portion 32 when the recording medium 90 is detached from the first panel 10. The entire of the plate portion 32 may be located outside the medium disposition area A. In order to guide the user that the plate portion 32 is the pressed portion, a mark M is drawn on the surface of the plate portion 32.

As illustrated in FIG. 6, the movable plate portion 30 is connected with the other portion (in the example, the support plate portion 21) of the first panel 10 via the arm portion 31. The movable plate portion 30 is inclined toward the outside of the accommodating case 1 around the connecting portion 31a that is the end of the arm portion 31. As illustrated in FIG. 3, the arm portion 31 has an elongated shape extending from the connecting portion 31a. In other words, the width (in the example, the width in the right-left direction) of the arm portion 31 is smaller than the length (in the example, the length in the front-rear direction) thereof. Thus, the force required to push down the movable plate portion 30 can be reduced compared to an embodiment in which the plate portion 32 having a wide width is directly connected with the support plate portion 21. The arm portion 31 may have a hole. With the hole, the force required to push down the plate portion 30 can be further reduced.

As illustrated in FIGS. 1 and 6, the support plate portion 21 is located higher than the movable plate portion 30. In other words, a step is formed between the movable plate portion 30 and the support plate portion 21 so that a clearance is formed between the recording medium 90 and the movable plate portion 30 when the recording medium 90 is disposed on the support plate portion 21. Accordingly, the fingertip of the user can be inserted further easily between the movable plate portion 30 and the recording medium 90. When the movable plate portion 30 is pushed down, the clearance is enlarged.

In the present example, as illustrated in FIG. 6, the support plate portion 21 is located higher than the base panel 12. Meanwhile, the movable plate portion 30 is located on the same plane as the base panel 12, in a state where the movable plate portion 30 is not pushed down. The step is formed between the movable plate portion 30 and the support plate portion 21 without protruding the movable plate portion 30 from the plane to outside the accommodating case 1 (in FIG. 6, the movable plate portion 30 is not protruded downward).

As described above, the movable plate portion 30 (in the present example, arm portion 31) is connected with the support plate portion 21 at the connecting portion 31a which is located on the end thereof. As illustrated in FIG. 6, the arm portion 31 is bent toward a position of the connecting portion 31a (in other words, the height of the base panel 12) lower than the support plate portion 21. Thus, a portion of the connecting portion 31a toward the arm portion 31 extends in a direction away from the recording medium 90. Thus, when a force to push the movable plate portion 30 is applied from outside the accommodating case 1, the movable plate portion 30 is suppressed from pushing up the recording medium 90. The arm portion 31 obliquely extends in the direction away from the recording medium 90. After that, the arm portion 31 is bent again and extends forward.

As illustrated in FIGS. 7 and 8, a plurality of ribs 21b, 21c, 21d and 21e are formed on a back surface (an outer surface) of the support plate portion 21. The ribs 21b, 21c, 21d and 21e are formed like wall standing on the back surface. The ribs 21b and 21e extend in the front-rear direction. Therefore, the support plate portion 21 can be suppressed from being bent guided by the inclination of the movable plate portion 30. In the present example, arm portion 31 is located between two ribs 21e. The ribs 21c and 21d extend in a direction in which the engagement portions 22R and 22L face each other. Accordingly, the arm portion 22b of the engagement portions 22R and 22L can be suppressed from being opened when the first panel 10 receives the external force. In the present example, the engagement portions 22R and 22L are located between the ribs 21c and 21d.

As illustrated in FIG. 1, the peripheral wall 23 surrounding the medium disposition area A is formed on the inner surface of the accommodating case 1. Thus, even though the external force acts on the first panel 10, a portion inside the medium disposition area A can be suppressed from being bent. In addition, two engagement portions 22R and 22L can be suppressed from being opened outside. As illustrated in FIG. 7, the peripheral wall 23 is raised from the base panel 12 and the upper edge of the peripheral wall 23 is located higher than the support plate portion 21. Thus, the position of the recording medium 90 can be defined. The cross-section of the peripheral wall 23 of the present example has a recessed shape open downward. The peripheral wall 23 includes an inner wall 23i, an outer wall 23o surrounding the inner wall 23i and an upper wall 23t which connects an upper edge of the inner wall 23i and an upper edge of the outer wall 23o.

The peripheral walls 23 are provided in the front and rear, and the right and left of the medium disposition area A. Accordingly, the movement of the recording medium 90 is restricted in the front-rear direction and the right-left direction. In the example, the medium disposition area A is substantially rectangular shape and each portion of the peripheral wall 23 is provided along four edges of the medium disposition area A. In other words, as illustrated in FIGS. 1 and 3, the peripheral wall 23 has a front wall 23b on the front of the medium disposition area A. In addition, the peripheral wall 23 has a rear wall 23a on the rear of the medium disposition area A. Furthermore, the peripheral wall 23 has, on each side of the right side and the left side of the medium disposition area A, side walls 23c and 23d arranged in the front-rear direction. The engagement portions 22R and 22L are located between the side walls 23c and 23d.

As illustrated in FIG. 3, the width of the movable plate portion 30 is smaller than the length of the edge of the front of the medium disposition area A in the right-left direction. Thus, the front wall 23b is formed on the front side of the medium disposition area A. In the present example, a width W1 of the plate portion 32 extending over the front edge of the medium disposition area A is smaller than the length of the front edge of the medium disposition area A. The front wall 23b is provided in the right and left of the plate portion 32.

As illustrated in FIG. 4, the accommodating case 1 includes a film 61 covering the outer surface thereof. Two edges 61a of the film 61 located opposite to each other are attached to the outer surface of the first panel 10 and the outer surface of the second panel 40, respectively. In the present example, the right edge 61a of the film 61 is attached to the edge of the first wall 11b in the outer surface of the first panel 10. The left edge 61a of the film 61 is attached to the edge of the second wall 41b in the outer surface of the second panel 40. The other portion of the film 61 is not attached to the first panel 10, the second panel 40 or the coupling wall 51. The portion other than the right and left edges 61a of the film 61 may be partially attached to the first panel 10 or the second panel 40 such that the opening and closing of the accommodating case 1 is allowed.

A distance (the width of the film 61 in the right-left direction) between two edges 61a corresponds to a distance between an attachment position in the outer surface in the first panel 10 and an attachment position in the outer surface in the second panel 40 in a state where the first panel 10 and the second panel 40 are closed. In other words, the width of the film 61 in the right-left direction corresponds to a distance from the edge of the first panel to the edge of the second panel 40 in a state where the accommodating case 1 is closed. Thus, in a state where the first panel 10 and the second panel 40 are closed, the film 61 comes in contact with the outer surface of the first panel 10, the outer surface of the coupling wall 51 and the outer surface of the second panel 40 without a substantial clearance. Thus, when the accommodating case 1 is closed, the force acting from the outside of the accommodating case 1 to the movable plate portion 30 can be reduced by the film 61.

The film 61 is flexible. Thus, as illustrated in FIG. 4, when opening the accommodating case 1, film 61 is bent and a clearance is formed between the outer surface of the first panel 10 or the outer surface of the second panel 40 and the film 61. As a result, the movable plate portion 30 can be inclined to the outside (the lower side in FIG. 6) of the accommodating case 1. In FIGS. 5 and 6, the film 61 is omitted.

As described above, the accommodating case 1 has the inner surface having the medium disposition area A for disposing the recording medium 90. The engagement portions 22R and 22L are formed in the inner surface of the accommodating case 1. The engagement portions 22R and 22L are able to engage with the edge of the recording medium 90 so that the recording medium 90 disposed in the medium disposition area A is suppressed from separating from the inner surface (the surface of the support plate portion 21). The movable plate portion 30 is provided in the accommodating case 1 and forms a part of the inner surface of the accommodating case 1. The movable plate portion 30 is movable to be recessed toward the outside of the accommodating case 1 relative to the other portion of the inner surface. Furthermore, the movable plate portion 30 is located over the medium disposition area A and the outside area of the medium disposition area A. According to the above structure, the user can easily detach the recording medium 90 from the accommodating case by pushing down the movable plate portion 30. In addition, the recording medium 90 can be protected from the outside of the accommodating case 1 by the movable plate portion 30.

The accommodating case 1 includes the support plate portion 21 which supports the recording medium 90 disposed in the medium disposition area A. The support plate portion 21 is located higher than the movable plate portion 30. With the above structure, the finger of the user can be easily inserted between the movable plate portion 30 and the recording medium 90. The movable plate portion 30 is connected with the support plate portion 21 in the end 31a thereof and is bent at the end 31a toward a position lower than the support plate portion 21. With the above structure, when the force is applied from outside the accommodating case 1 to the movable plate portion 30, the engagement between the recording medium 90 and the engagement portions 22R and 22L is suppressed from being released, compared to a structure in which the movable plate portion 30 is bent in the middle of the movable plate portion 30.

In addition, the movable plate portion 30 can be inclined toward the outside of the accommodating case 1 around the end 31a. The end 31a is located inside the medium disposition area A and the opposite end 32a is located outside the medium disposition area A. When the movable plate portion 30 is inclined, a moving amount of a portion toward the end 31a of the movable plate portion 30 is small compared to a moving amount of the end 32a. Thus, according to the above structure, even though the movable plate portion 30 is inclined inward by the force from outside the accommodating case 1, the movable plate portion 30 is suppressed from pushing up the recording medium 90. As a result, the engagement of the recording medium 90 and the engagement portions 22R and 22L can be surely kept.

The movable plate portion 30 includes the arm portion (a first portion in claims) 31, the plate portion (a second portion in the claims) 32 having a width greater than the arm portion 31. One part of the plate portion 32 is located in the area outside the medium disposition area A. According to the structure, user easily pushes the movable plate portion 30. The arm portion 31 has an elongated shape extending from the end 31a. Accordingly, the force required to push the movable plate portion 30 can be reduced.

The accommodating case 1 includes the film 61 covering the outer surface thereof. According to the structure, the recording medium 90 can be more effectively protected from the outside of the accommodating case 1. In addition, the accommodating case 1 includes the first panel 10 having the medium disposition area A is provided and the second panel 40 opposite to the first panel 10 in state of closing the accommodating case 1. Two edges 61a of the film 61 opposite to each other are attached to the outer surface of the first panel 10 and the outer surface of the second panel 40, respectively. The distance between two edges 61a may correspond to the distance between the attachment position in the outer surface in the first panel 10 and the attachment position in the outer surface in the second panel 40. Accordingly, when the first panel 10 and the second panel 40 are closed, the film 61 comes into contact with the outer surface of the first panel 10. As a result, when the accommodating case 1 is closed, the force to push the movable plate portion 30 inwardly can be suppressed by the film 61.

Note that, the invention is not limited to the embodiment described above and various modifications can be provided.

For example, in the above description, the support plate portion 21 is located higher than the movable plate portion 30. However, the movable plate portion 30 and the support plate portion 21 may be formed on the same plane as each other.

In the above description, the connecting portion 31a of the movable plate portion 30 is located inside the medium disposition area A and is connected with the support plate portion 21. However, the movable plate portion 30 may be connected with the base panel 12.

In the above description, the medium disposition area A is arranged on substantially center portion of the first panel 10. However, the medium disposition area A may be offset from the center of the first panel 10 in the right-left direction or the front-rear direction. With this structure, the bending of the first panel 10 unlikely affects the support plate portion 21 or the engagement portions 22R and 22L. Two engagement portions 22R and 22L are unlikely to open in the right-left direction when the first panel 10 is bent.

Second Embodiment

Figure 9:
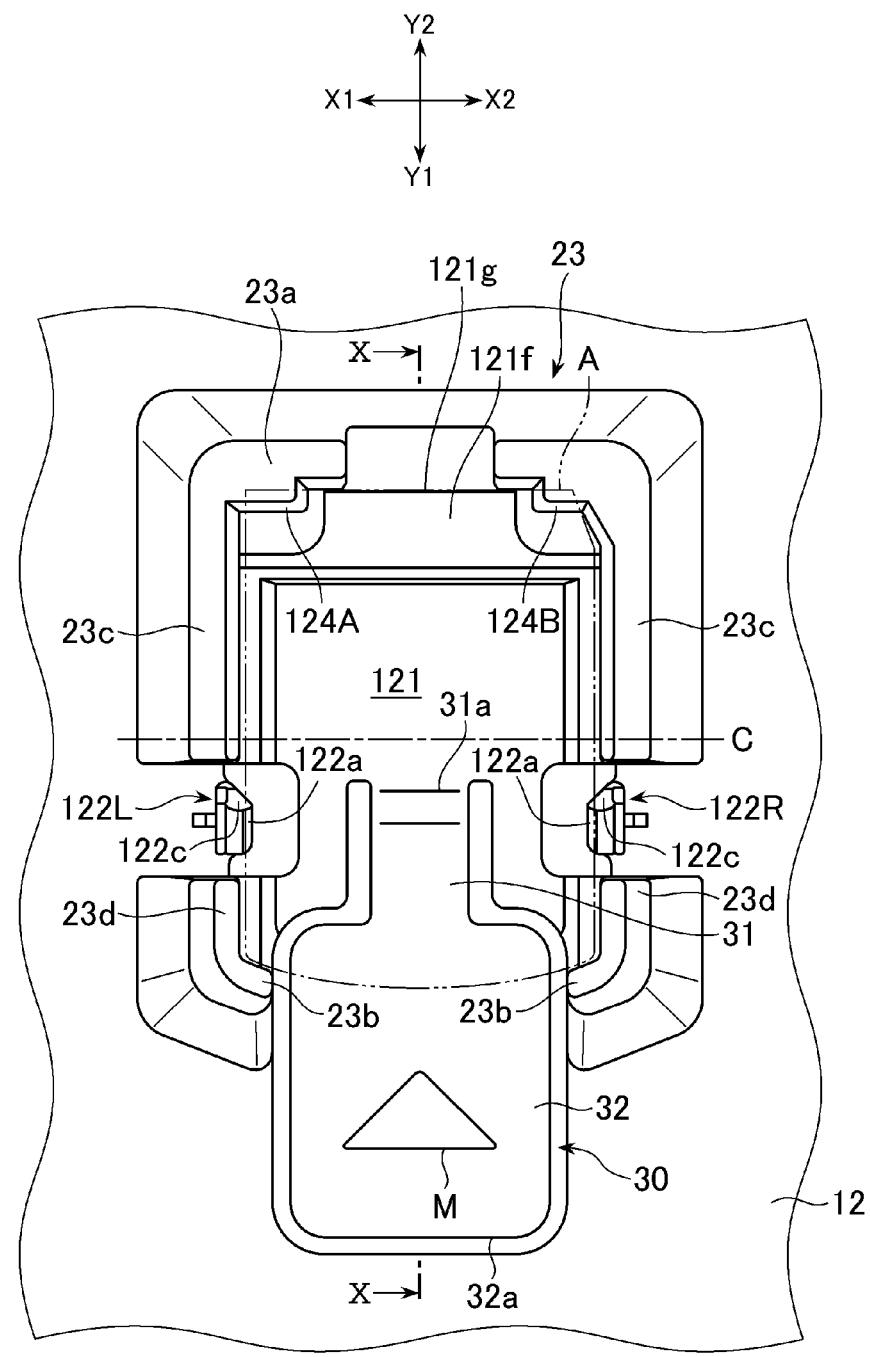
FIG. 9 is an enlarged plan view of the first panel included in the accommodating case according to a second embodiment. In the same view, a portion having the medium disposition area is enlarged.
Figure 10:
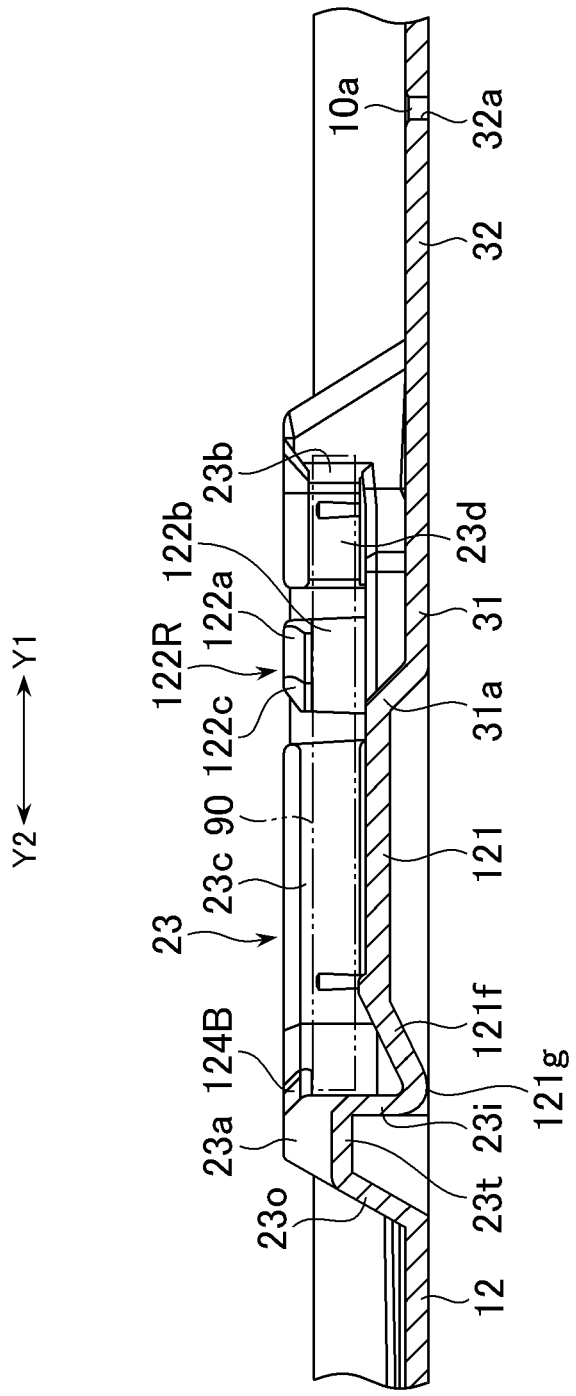
FIG. 10 is a cross-sectional view which is taken along a line X-X illustrated in FIG. 9.

The accommodating case according to a second embodiment will be described. FIG. 9 is an enlarged plan view of the first panel included in the accommodating case according to a first example of the second embodiment. In the same view, the portion having the medium disposition area A is enlarged. FIG. 10 is across-sectional view which is taken along a line X-X illustrated in FIG. 9. In the accommodating case of the present example, portions which are not illustrated in the views are the same as the accommodating case 1 described above. The same reference numeral is given to the same place which is described above and thus the description thereof will be omitted.

As illustrated in FIGS. 9 and 10, the accommodating case of the present example includes first engagement portions 122R and 122L, and second engagement portions 124A and 124B. Both of the engagement portions 122R and 122L, and the second engagement portions 124A and 124B restrict that the recording medium 90 is separated from the inner surface (particularly, an inner surface of a support plate portion 121) of the accommodating case. In the example, two second engagement portions 124A and 124B are positioned away from each other. The second engagement portions 124A and 124B are provided at corners of the medium disposition area A. Note that, the second engagement portions 124A and 124B may be one. In that case, it is preferable that the second engagement portion be provided in the center portion of edge (in the example, a rear edge) of the medium disposition area A.

The first engagement portions 122R and 122L are substantially the same as the engagement portions 22R and 22L in the accommodating case 1. In other words, the first engagement portions 122R and 122L pinches the edge (in the example, the right edge and the left edge) of the recording medium 90 disposed in the medium disposition area A with the inner surface (particularly, the surface of the support plate portion 121) of the first panel 10. Particularly, as illustrated in FIG. 9, the first engagement portions 122R and 122L include a hook portion 122a. The edge of the recording medium 90 is arranged in the medium disposition area A may be pinched by the hook portion 122a and the support plate portion 121. The first engagement portions 122R and 122L are elastically and deformably formed so as to retreat from the medium disposition area A. In other words, as illustrated in FIG. 10, the first engagement portions 122R and 122L includes the arm portion 122b similar to the above description and the hook portion 122a can be elastically retreated from the medium disposition area A in the right direction and the left direction.

The arm portion 122b of the present example does not have a bending portion different from the arm portion 22b described above and extends directly upward from the base panel 12. Accordingly, an elastic force of the first engagement portions 122R and 122L is high compared to the engagement portions 22R and 22L.

As illustrated in FIG. 10, the second engagement portions 124A and 124B are formed so that the edge (in the example, the rear edge) of the recording medium 90 can be positioned between the inner surface (particularly, the surface of the support plate portion 121) of the first panel 10 and the second engagement portions 124A and 124B. The second engagement portions 124A and 124B extend from the uppermost portion of the peripheral wall 23 toward the inside of the medium disposition area A. Then, the second engagement portions 124A and 124B face a plane along the support plate portion 121 in the thickness direction (the thickness direction of the recording medium 90) of the support plate portion 121. A distance between the plane and the second engagement portions 124A and 124B corresponds to the thickness of the recording medium 90. Accordingly, the edge of the recording medium 90 may be located below the second engagement portions 124A and 124B. In the present example, the second engagement portions 124A and 124B extend forward from the rear wall 23a of the peripheral wall 23.

The second engagement portions 124A and 124B are restricted to retreat from the medium disposition area A. In other words, a cross-section of the peripheral wall 23 is recessed to open downward. The peripheral wall 23 includes the outer wall 23o and the upper wall 23t. Thus, the peripheral wall 23 is restrained from being spread to the outside of the medium disposition area A. As a result, the second engagement portions 124A and 124B are also restrained from being retreated from the medium disposition area A. In other words, the second engagement portions 124A and 124B are restrained from moving to the outside of the medium disposition area A.

The accommodating case according to the second embodiment includes two types of engagement portions as described above and the recording medium 90 can be further effectively suppressed from accidentally separating from the support plate portion 121.

As illustrated in FIG. 9, the second engagement portions 124A and 124B are provided in the rear side of the medium disposition area A. The movable plate portion 30 is arranged over the front edge of the medium disposition area A. Specifically, the second engagement portions 124A and 124B, and the edge of the medium disposition area A are located opposite to each other across the medium disposition area A. Thus, when the front edge of the recording medium 90 on the medium disposition area A is lifted by the user, the recording medium 90 can be easily inclined.

When the recording medium 90 is arranged on the support plate portion 21, the user obliquely inserts the rear edge of the recording medium 90 below the second engagement portions 124A and 124B, after that, the front of the recording medium 90 is laid down toward the support plate portion 21 and the engagement between the recording medium 90 and thereby the first engagement portions 122R and 122L is established. As illustrated in FIGS. 9 and 10, the first engagement portions 122R and 122L are located forward from the second engagement portions 124A and 124B. Thus, when the user lays down the recording medium 90 toward the support plate portion 21, a large force is easily acted from the recording medium 90 to the first engagement portions 122R and 122L. In the example, the second engagement portions 124A and 124B are located rearward from the center line C (see FIG. 9, in the example, the center line in the front-rear direction) of the medium disposition area A. The first engagement portions 122R and 122L are offset forward from the center line C.

As illustrated in FIGS. 9 and 10, the hook portion 122a of the first engagement portions 122R and 122L includes an inclined surface 122c. The inclined surface 122c is directed to the second engagement portions 124A and 124B and is directed obliquely upward. Thus, when the user arranges the recording medium 90 on the support plate portion 121, the recording medium 90 abuts the inclined surface 122c. As a result, the force to widen the first engagement portions 122R and 122L in the right-left direction is easily acted from the recording medium 90.

As illustrated in FIG. 10, the rearmost portion of the support plate portion 121 has a recess into which the rear edge of the recording medium 90 is fitted. In other words, the support plate portion 121 has a inclined surface 121f on the rearmost portion thereof. The inclined surface 121f is inclined such that the rearmost portion of the support plate portion 121 is recessed. Accordingly, when the recording medium 90 is detached and when the recording medium 90 is arranged on the support plate portion 121, the recording medium 90 can be easily inclined. The inclined surface 121f of the present example is inclined greater than the inclined surface 21f of the accommodating case 1 such that a rearmost edge 121g of the support plate portion 121 is lowered (see, FIG. 6). Especially, in the present example, the rear edge 121g of the support plate portion 121 is located on the same height as the base panel 12.

Second Example of Second Embodiment

Figure 11:
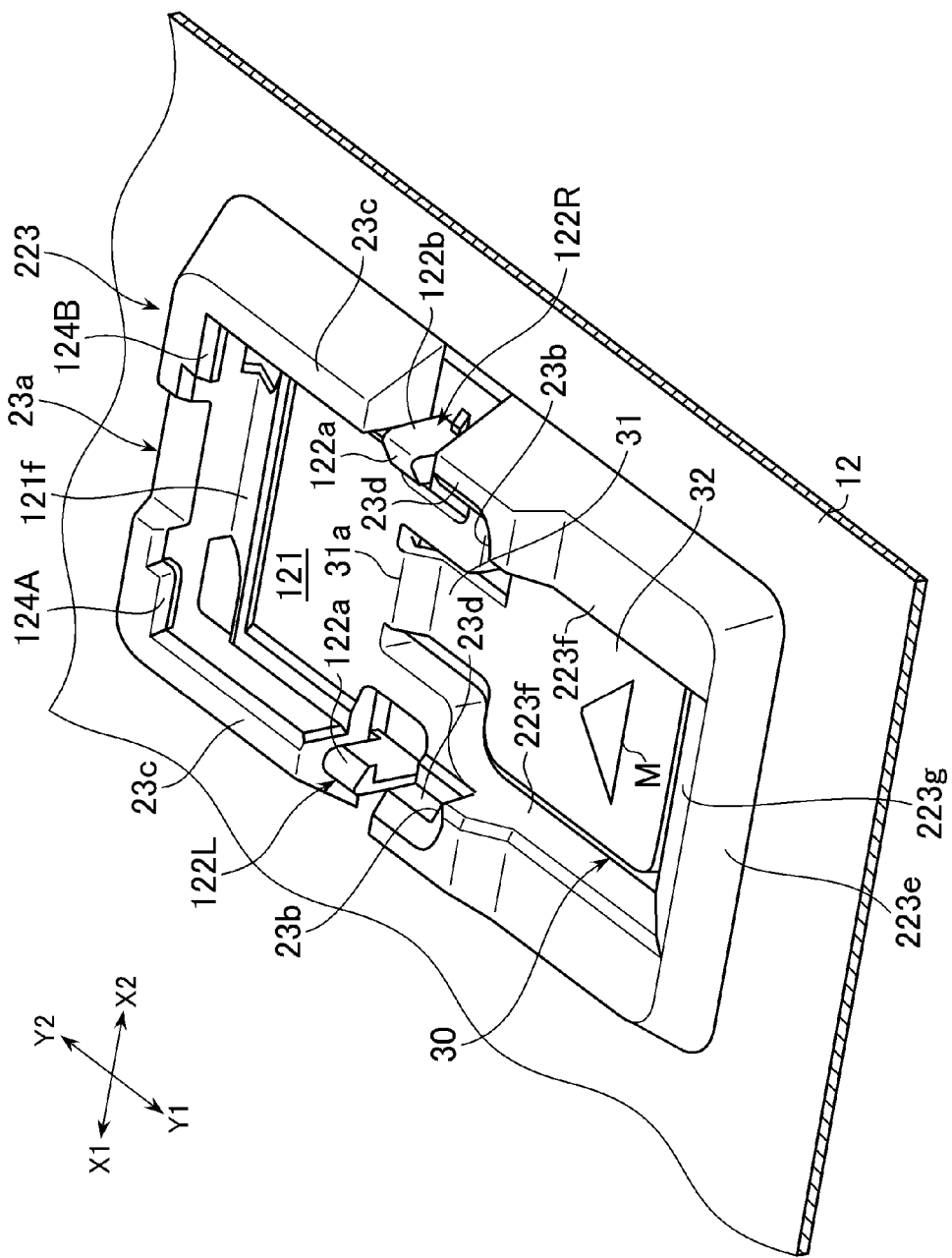
FIG. 11 is a perspective view illustrating a second example of the accommodating case according to the second embodiment.

A second example of the accommodating case according to the second embodiment will be described. FIG. 11 is a perspective view illustrating a main portion of the accommodating case of the second example. In the same view, the support plate portion 121 of the accommodating case and the movable plate portion 30 is enlarged. In the present example, portions which are not illustrated in FIG. 11 are the same as the accommodating case 1 described above. The same reference numeral is given to the same place which is described above and the description thereof will be omitted.

The accommodating case of the example in FIG. 11 includes a peripheral wall 223 corresponding to the peripheral wall 23 described above. The peripheral wall 223 includes two walls extending in a direction in which two first engagement portions 122R and 122L face each other. In the example, the peripheral wall 223 includes a rear wall 23a and a foremost wall 223e. Two walls 23a and 223e face each other in a direction (in the example, the front-rear direction) orthogonal to the facing direction of the first engagement portions 122R and 122L each other. In addition, the two walls 23a and 223e are located opposite to each other across the medium disposition area A. Thus, even though the first panel 10 is bent by receiving the external force, the support plate portion 121 can be suppressed from being bent. As a result, the hook portions 122a of the two engagement portions 122R and 122L can be further effectively suppressed from being elastically deformed to be open.

The peripheral wall 223 of the example includes the rear wall 23a, the front wall 23b and the side walls 23c and 23d, similar to the peripheral wall 23. In addition to the walls, the peripheral wall 223 includes a side wall 223f and the foremost wall 223e described above. The side wall 223f is located on the right and left of the movable plate portion 30, and extends from the front wall 23b in the extending direction (in the example, forward) of the movable plate portion 30. Accordingly, the center of the first panel 10 can be further effectively suppressed from being bent.

The foremost wall 223e extends in the right-left direction and connects the foremost of the side walls 223f. The plate portion 32 of the movable plate portion 30 is surrounded by the foremost wall 223e and the side walls 223f. In other words, the peripheral wall 223 surrounds the movable plate portion 30 as well as the medium disposition area A as a whole.

The foremost wall 223e is located from the movable plate portion 30 in the extending direction (in the example, forward) of the movable plate portion 30. When the fingertip of the user lifts the front edge of the recording medium 90, the finger abuts the foremost wall 223e and then it is possible to use the foremost wall 223e as a pivot point. As a result, the lifting operation of the front edge of the recording medium 90 with the fingertip can be easily performed.

The foremost wall 223e includes an inclined surface 223g on the upper surface thereof to be inclined to fall toward the movable plate portion 30. The fingertip of the user may be guided toward the plate portion 32 of the movable plate portion 30 by the inclined surface 223g. As a result, the removing work of the recording medium 90 may be further easily performed.

The height of the side walls 223f and the foremost wall 223e which surround the plate portion 32 is lower than the height of the rear wall 23a, the front wall 23b and the side wall 23c and 23d surrounding the medium disposition area A. In other words, the upper surface of the side walls 223f and the front wall 223e are positioned lower than the upper surface of the rear wall 23a, the front wall 23b and the side walls 23c and 23d. Thus, the side walls 223f and the foremost wall 223e are unlikely to interfere the finger of the user.

Third Example of Second Embodiment

Figure 12:
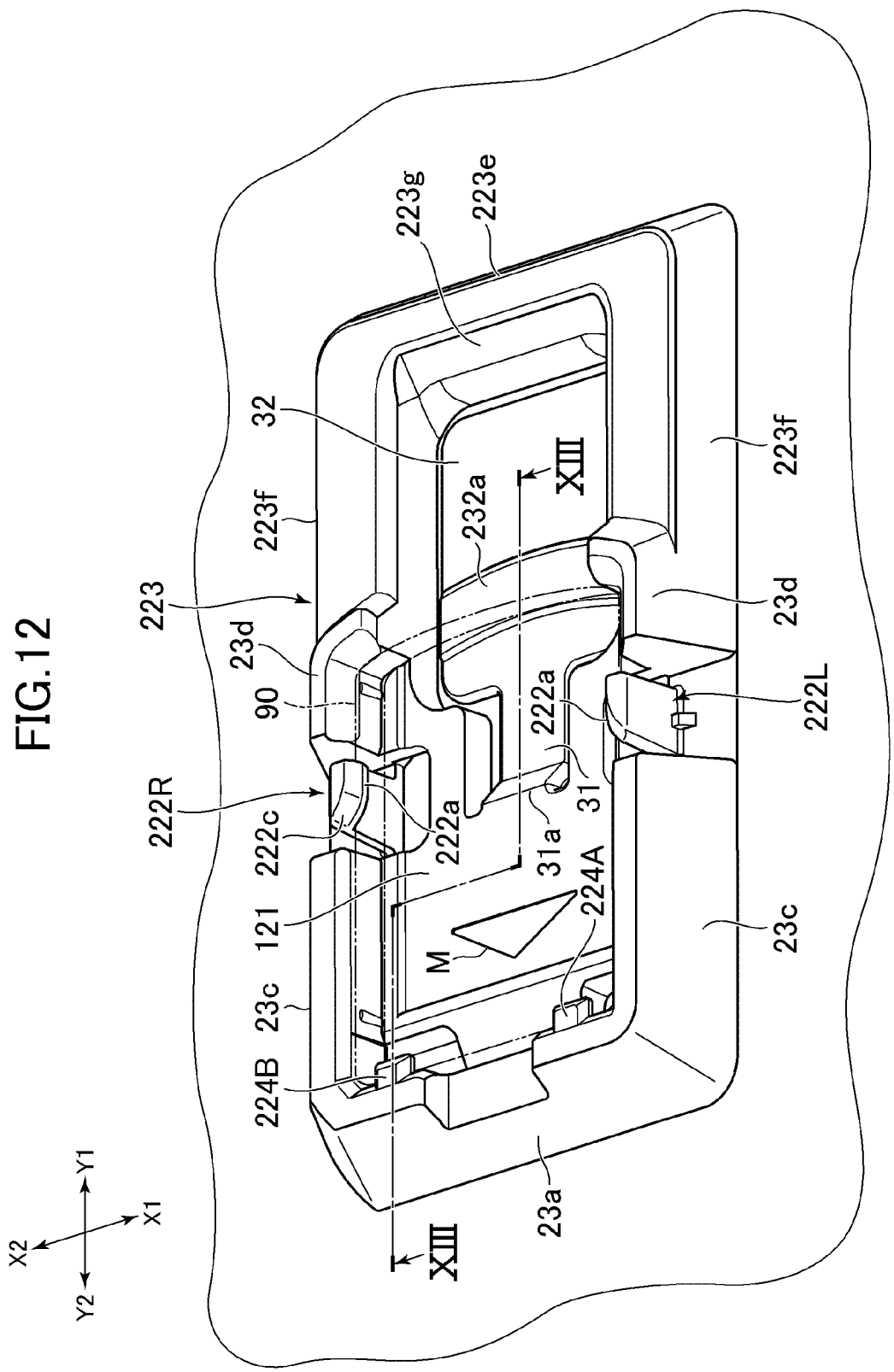
FIG. 12 is a perspective view illustrating a third example of the accommodating case according to the second embodiment.

A third example of the accommodating case according to the second embodiment will be described. FIG. 12 is a perspective view illustrating a main portion of the accommodating case of the example. FIG. 13 is a cross-sectional view which is taken along a line XIII-XIII illustrated in FIG. 12. In the accommodating case of the example, portions which are not illustrated in FIGS. 12 and 13 are the same as the accommodating case 1 described above. The same reference numeral is given to the same place which is described above and the description thereof will be omitted.

As illustrated in FIG. 12, the accommodating case of the present example also includes the peripheral wall 223, similar to the example in FIG. 11. The peripheral wall 223 includes right and left side walls 23c, and a rear wall 23a. In the rear wall 23a, two second engagement portions 224A and 224B are formed corresponding to the second engagement portions 124A and 124B illustrated in the example of FIGS. 9 to 11. The second engagement portions 224A and 224B protrude from the upper edge of the rear wall 23a toward the medium disposition area A (see, FIG. 3). Similar to the second engagement portions 124A and 124B, the rear edge of the recording medium 90 can be inserted below the second engagement portions 224A and 224B.

Different from the second engagement portions 124A and 124B, the second engagement portions 224A and 224B are located away from the side wall 23c. In other words, a clearance is provided between the right second engagement portion 224B and the right side wall 23c, and a clearance is also provided between the left second engagement portion 224A and the left side wall 23c. Thus, the second engagement portions 224A and 224B are easily bent compared to the second engagement portions 124A and 124B illustrated in FIGS. 9 to 11 which are connected with the side wall 23c (see, a two-dot chain line in FIG. 13). As a result, when the user inserts the recording medium 90 in a wrong way and then the recording medium 90 strongly hits the second engagement portions 224A and 224B, the second engagement portions 224A and 224B are bent so that an excessive load can be suppressed from being applied on the recording medium 90.

The accommodating case of the present example has first engagement portions 222R and 222L corresponding to the first engagement portions 122R and 122L described above. The first engagement portions 222R and 222L include, at the end thereof, hook portions 222a protruding toward the medium disposition area A. The hook portion 222a includes, at the front end, an inclined surface 222c. When the recording medium 90 is fitted into the medium disposition area A, the inclined surface 222c is directed obliquely upward so as to incline and abut to the recording medium 90.

FIG. 14 is a plan view of the second engagement portion 222R. As illustrated in the same view, the inclined surface 222c of the present example is bent viewed in a plan view. In other words, a front portion 222d of the inclined surface 222c is directed obliquely upward and inward in the right-left direction. Meanwhile, a rear portion 222e of the inclined surface 222c is being obliquely upward and rearward. The rear portion 222e of the inclined surface 222c is directed the second engagement portions 222A and 222B while being obliquely upward. The direction of the inclined surface 222c is gradually changed from the rear portion 222e between the inclined surface 222c and the front portion 222d. According to the inclined surface 222c, when the recording medium 90 is fitted into the medium disposition area A, the edge of the recording medium 90 is smoothly moved on the inclined surface 222c. And thus, the recording medium 90 is easily inserted.

In the example, the plate portion 32 includes a band like convex portion 232a extending in the right-left direction. According to the convex section 232a, the strength of the plate portion 32 can be increased.

As described above, in the second embodiment, the accommodating case includes the first engagement portions 122R and 122L (222R and 222L) extending toward the inside of the medium disposition area A, and the second engagement portions 124A and 124B (224A and 224B). The first engagement portions 122R and 122L (222R and 222L) are elastically deformable so as to retreat from the medium disposition area A. On the other hand, the second engagement portions 124A and 124B (224A and 224B) are restrained from retreating from the medium disposition area A. According to the structure, the recording medium 90 in the medium disposition area A can be further effectively suppressed from accidentally separating from the inner surface of the accommodating case.

In the second embodiment, the accommodating case includes two walls 23a and 223e extending in a direction in which the first engagement portions 122R and 122L (222R and 222L) face each other, in other words, in the right-left direction. The walls 23a and 223e are located opposite to each other across the medium disposition area A in a direction orthogonal to a facing direction of the two first engagement portions 122R and 122L (222R and 222L), in other words, in the front-rear direction. According to the structure, the first engagement portions 122R and 122L (222R and 222L) of the accommodating case can be suppressed from being deformed by the force received from outside. Particularly, in the example described above, the accommodating case includes the peripheral wall 223 surrounding the movable plate portion 30 and the medium disposition area A and including two walls 23a and 223e. According to the structure, the portion inside the peripheral wall 224 is unlikely to deform.

Third Embodiment

Figure 15:
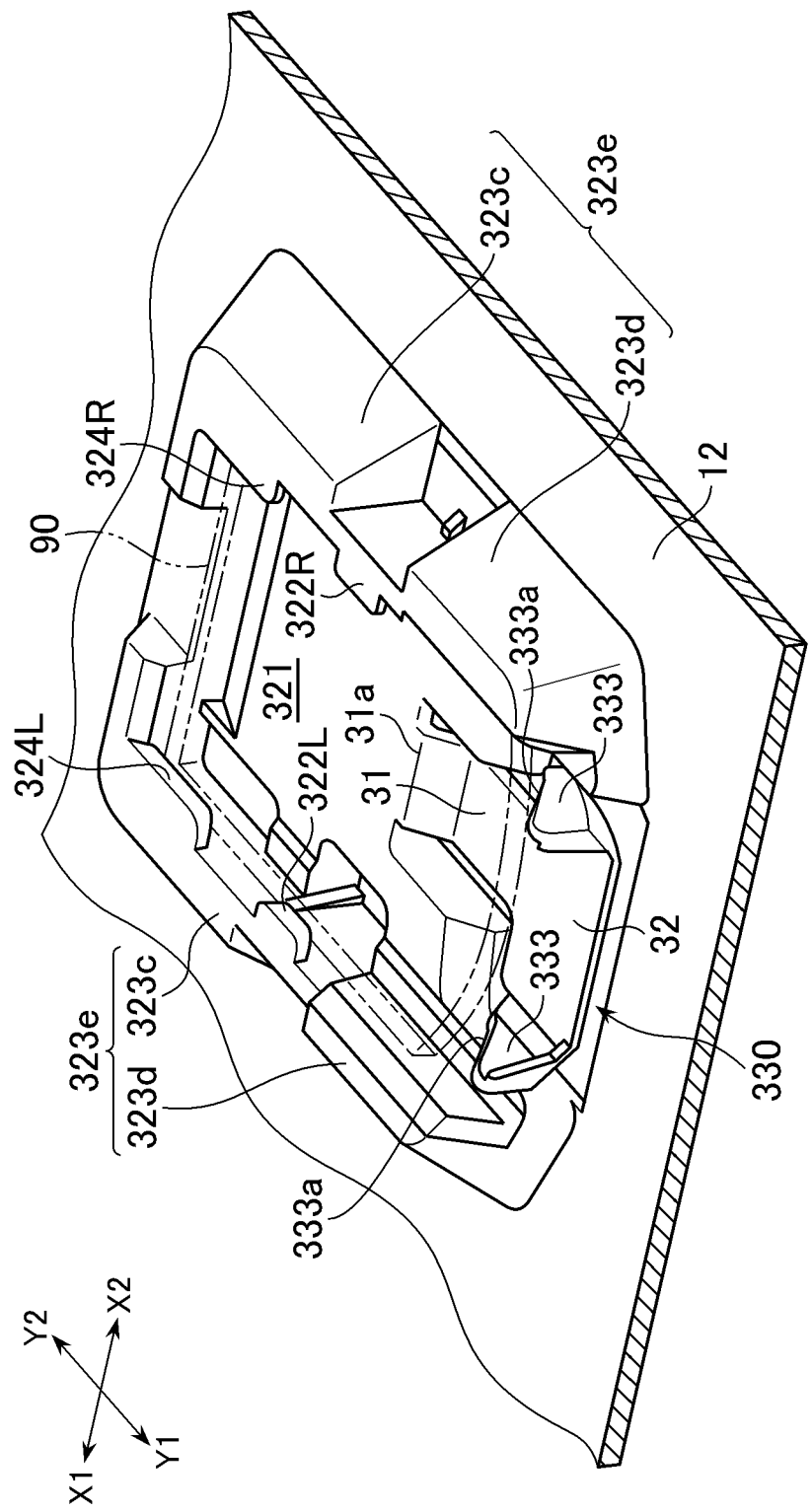
FIG. 15 is a perspective view illustrating a main portion of the accommodating case according to a third embodiment.
Figure 16:
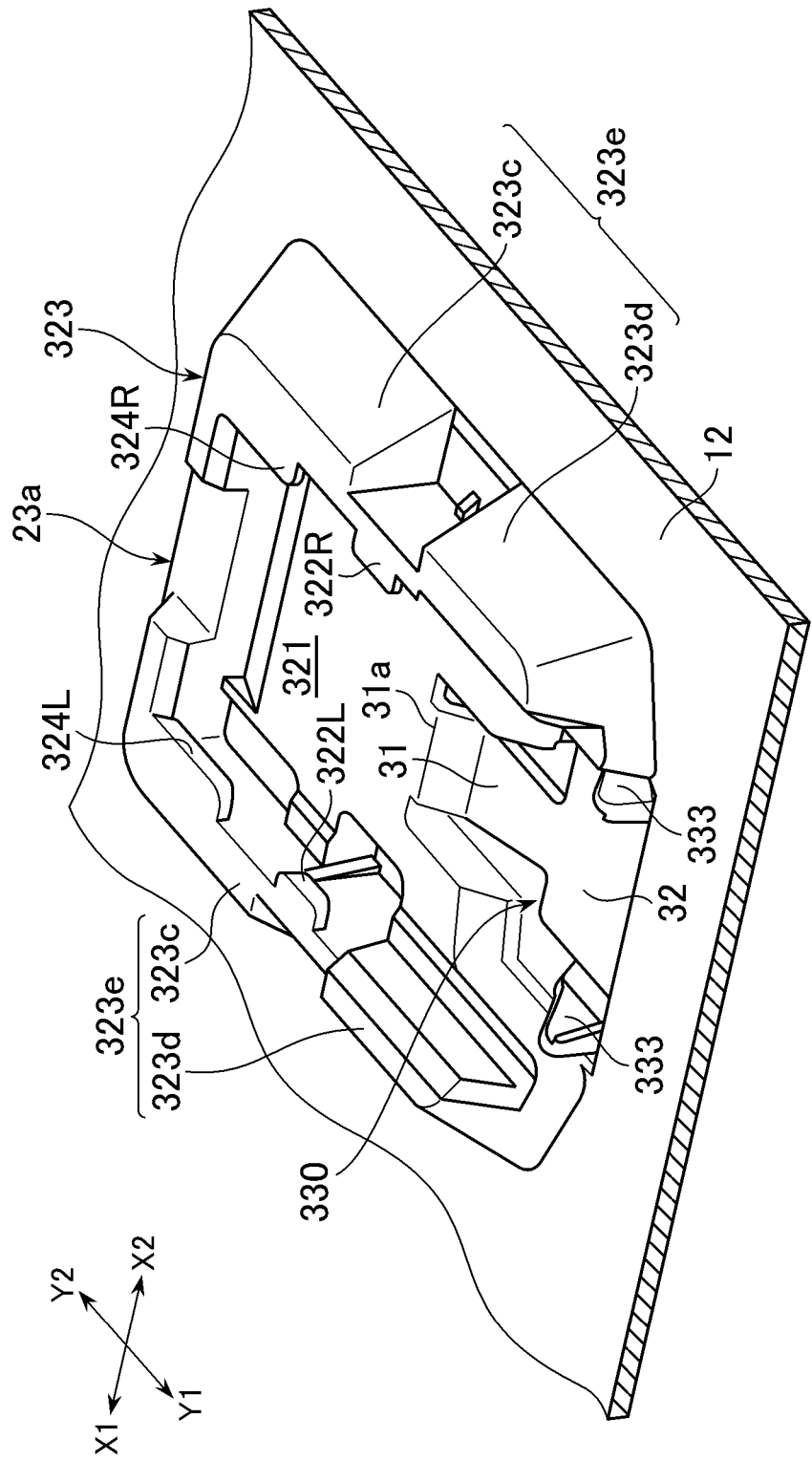
FIG. 16 is a perspective view illustrating a state where a movable plate portion included in the accommodating case of an embodiment illustrated in FIG. 15 is inclined.

The accommodating case according to a third embodiment will be described. FIGS. 15 and 16 are perspective views illustrating main portions of the accommodating case of the present example according to the third embodiment. In the same views, a support plate portion 321 of the accommodating case and a movable plate portion 330 is enlarged. FIG. 16 illustrates the movable plate portion 330 which is elastically deformed. In the present example, a portion which is not illustrated in the view is the same as the accommodating case 1 described above. The same reference numeral is given to the same place which is described above and the description thereof will be omitted.

As illustrated in FIGS. 15 and 16, the accommodating case of the present example includes a plurality of engagement portions 322L, 324L, 322R and 324R. The engagement portions 322R and 324R, and the engagement portions 322L and 324L are located opposite to each other across the medium disposition area A. In the present example, a plurality (in the example, two) of the engagement portions 322R and 324R are located on the right side of the medium disposition area A and aligned in the front-rear direction. A plurality (in the example, two) of the engagement portions 322L and 324L are located in the left side of the medium disposition area A and aligned in the front-rear direction. Alternatively, only one engagement portion, which is elongated in the front-rear direction, may be provided each of right side and left side of the medium disposition area A.

The edge (in the example, a right edge or a left edge) of the recording medium 90 can be located between an inner surface of the first panel 10 (particularly, a surface of the support plate portion 321) and the engagement portions 322L, 324L, 322R and 324R. The engagement portions 322L, 324L, 322R and 324R extend from the uppermost portion of a peripheral wall 323 surrounding the medium disposition area A toward the inside of the medium disposition area A. The engagement portions 322L, 324L, 322R and 324R face a plane along the support plate portion 321 in the thickness direction (the thickness direction of the recording medium 90) of the support plate portion 321.

The peripheral wall 323 includes side walls 323e on the right side and left side of the medium disposition area A, respectively. The medium disposition area A and the movable plate portion 330 are located between two side walls 323e. The engagement portions 322R and 324R extend from the right side wall 323e toward the opposite side (the left side) thereof. The engagement portions 322L and 324L extend from the left side wall 323e toward the opposite side (the right side) thereof.

The engagement portions 322L, 324L, 322R and 324R are formed so that the recording medium 90 can slide in a direction parallel to the surface of the support plate portion 321 (the inner surface of the accommodating case). In a state where the recording medium 90 is arranged on the support plate portion 321, the engagement portions 322L, 324L, 322R and 324R extend in a direction along the upper surface of the recording medium 90. The engagement portions 322L, 324L, 322R and 324R in the present example are formed so that the recording medium 90 can slide in the front-rear direction. Thus, the recording medium 90 can be moved from the medium disposition area A forward along the side walls 323e or can be moved toward the medium disposition area A rearward along the side walls 323e.

Similar to the peripheral wall 23, the peripheral wall 323 is restrained from a deformation in which the peripheral wall 323 is spread toward the outside of the medium disposition area A. Similar to the peripheral wall 23, a cross-section of the peripheral wall 323 has a recessed shape which is open downward and includes an inner wall surface 23i, an outer-wall 23o and an upper wall 23t (see, FIG. 7). Thus, the peripheral wall 323 is restricted from being spread outside medium disposition area A. Accordingly, engagement portions 322L, 324L, 322R and 324R are also restrained from retreating from the medium disposition area A. Specifically, the engagement portions 322L, 324L, 322R and 324R are restrained from moving in the right direction and the left direction. Thus, the upward movement of the recording medium 90 on the support plate portion 321 is strongly restricted by the engagement portions 322L, 324L, 322R and 324R. Particularly, even when an external force acts on the first panel provided with the medium disposition area A and thereby the first panel is bent, the recording medium 90 is suppressed from separating from the support plate portion 321.

As illustrated in FIG. 15, the accommodating case of the present example includes the movable plate portion 330. The movable plate portion 330 includes the arm portion 31 and the plate portion 32 described above. Different from the movable plate portion 30, the movable plate portion 330 further includes a stopper 333 restricting slide of the recording medium 90 arranged in the medium disposition area A. In the present example, the movable plate portion 330 includes a plurality (particularly, two) of the stoppers 333. The stopper 333 protrudes upward from the movable plate portion 330. A height of the stopper 333 exceeds a height of a step (a portion bending from the connecting portion 31a and extending obliquely downward) formed between the arm portion 31 and the support plate portion 321. Accordingly, in a state where the recording medium 90 is arranged in the medium disposition area A, the stopper 333 is located in front of the recording medium 90 and thus the forward movement of the recording medium 90 is restricted. The upper end of the stopper 333 is located higher than the upper surface of the recording medium 90 arranged on the support plate portion 321. Accordingly, the forward movement of the recording medium 90 can be reliably restricted.

As illustrated in FIG. 15, the stopper 333 includes a rear surface 333a which is directed (directed to the medium disposition area A) rearward. The rear surface 333a is inclined to extend obliquely forward and upward. When the movable plate portion 333 is pushed from the outside of the accommodating case, the rear surface 333a may abut the front end of the recording medium 90. The rear surface 333a is inclined and thus a upward force from the rear surface 333a to the recording medium 90 is reduced.

As illustrated in FIG. 15, a slight clearance is provided between the front end of the medium disposition area A (that is, the front end of the recording medium 90) and the rear surface 333a. Thus, when the movable plate portion 333 is pushed from the outside of the accommodating case, the rear surface 333a can be restrained from abutting the front end of the recording medium 90.

In the example, the stopper 333 is formed on the foremost portion of the movable plate portion 330. In addition, two stoppers 333 are located away from each other in the right-left direction. In the present example, the stopper 333 is formed in the end of the plate portion 32 in the right-left direction. Thus, the movement (backlash) of the recording medium 90 in the medium disposition area A can be suppressed.

When the recording medium 90 in the medium disposition area A is detached, the user pushes down the movable plate portion 330 (see, FIG. 16). Then, the user moves the recording medium 90 forward. When the recording medium 90 is separated from the front engagement portions 322R and 322L, the user can pull up the recording medium 90.

The engagement portions 322L, 324L, 322R and 324R are located offset to the rear from the medium disposition area A. Thus, timing when the recording medium 90 is separated from the front engagement portions 322R and 322L is faster than a state where the engagement portions 322L, 324L, 322R and 324R are not located offset to the rear. In the example, the engagement portions 324R and 324L are located on the rearmost portion of the side walls 323e. The engagement portions 322R and 322L are positioned substantially in the center portion of the side walls 323e. More particularly, the side walls 323e includes a first side wall 323c forming the rear portion thereof and a second side wall 323d forming the front portion thereof. All of the engagement portions 322L, 324L, 322R and 324R are formed in the first side walls 323c.

As described above, in the third embodiment, the engagement portions 322L, 322R, 324L, and 324R extend toward the inside of the medium disposition area A, and are formed so that the recording medium 90 can slide in one direction parallel to an inside surface of the medium disposition area A. According to the structure, the recording medium 90 is able to be detached and attached without forming the engagement portions 322L, 322R, 324L and 324R to be elastically deformed. Then, by forming the engagement portions 322L, 322R, 324L and 324R not to be elastically deformed, the recording medium 90 can be prevented from accidentally separating from the inner surface of the accommodating case. Particularly, in the example described above, the engagement portions 322L, 324L, 322R and 324R is restrained from retreating from the medium disposition area A. Thus, the recording medium 90 can be further effectively suppressed from accidentally separating from the inner surface of the accommodating case. The movable plate portion 330 includes the stopper 333 for restricting the slide of the recording medium 90 arranged in the medium disposition area A. Accordingly, the recording medium 90 can be suppressed from separating from the medium disposition area A when the movable plate portion 330 is not pushed down.

Fourth Embodiment

FIG. 17 is a perspective view of an accommodating case 400 according to a fourth embodiment. Here, the same reference numeral is given to the same place which is described above and the description thereof will be omitted.

As illustrated in FIG. 17, the accommodating case 400 includes a first panel 410 forming an outer surface of the accommodating case 400. The first panel 410 includes the medium disposition area A inside thereof. The medium disposition area A is the same as the medium disposition area A (see, FIG. 3) of the accommodating case 1 and has a shape corresponding to an outer shape of the recording medium 90 described above. Furthermore, the first panel 410 has the engagement portions 22R and 22L in the inner surface thereof. As described above, the engagement portions 22R and 22L are able to engage with the edge of the recording medium 90 so that the recording medium 90 is suppressed from separating from the inner surface of the first panel 410.

Different from the embodiments described above, the accommodating case 400 has an opening 410a in the first panel 410. The opening 410a is located over the medium disposition area A and an outside area of the medium disposition area A. In other words, a part of the opening 410a is positioned inside the medium disposition area A and the other part of the opening 410a is positioned outside the medium disposition area A. In the present example, the opening 410a is spread forward from inside the medium disposition area A. Thus, when the recording medium 90 is arranged in the medium disposition area A, the opening 410a is positioned below the front edge of the recording medium 90. A width of the opening 410a is the same as the width of the plate portion 32 of the movable plate portion 30 and smaller than the width of the medium disposition area A. The front walls 23b are formed at the right and left sides of the opening 410a.

An outer surface of the accommodating case 400 is covered by the film 61 described above. Similar to the accommodating case 1, two edges 61a of the film 61 located opposite to each other are attached to the outer surface of the first panel 410 and the outer surface of the second panel 40, respectively (see, FIG. 4). Other portions of the film 61 are not attached to the first panel 410, the second panel 40 or the coupling wall 51. In addition, as described above, the distance (the width of the film 61 in the right-left direction) between two edges 61a corresponds to the distance between the attachment position in the outer surface in the first panel 410 and the attachment position in the outer surface in the second panel 40 in a state where the first panel 410 and the second panel 40 are closed. Thus, in a state where the first panel 410 and the second panel 40 are closed, the film 61 comes into contact with the outer surface of the first panel 410, the outer surface of the coupling wall 51 and the outer surface of the second panel 40 without a substantial clearance. And thus, the opening 410a is closed by the film 61. Thus, when the accommodating case 400 is closed, a force acting on the recording medium 90 from the outside of the accommodating case 400 can be reduced by the film 61. In addition, the film 61 is flexible. Thus, when the accommodating case 400 is open, the film 61 is bent and can be separated from the outer surface of the first panel 410 (see, FIG. 4).

As described above, the accommodating case 400 has the first panel 410 with the medium disposition area A. The first panel 410 includes the engagement portions 22R and 22L for suppressing the recording medium 90 from separating from the inner surface thereof. The first panel 410 has the opening 410a located over the medium disposition area A and the outside area of the medium disposition area A. Furthermore, the outer surface of the accommodating case 400 has the film 61 attached thereto which has a flexibility and is able to separate from the first panel 410 in a state where the accommodating case 400 is open. According to such an accommodating case 400, the recording medium 90 can be easily detached from the accommodating case 400 by inserting the fingertip of the user in the opening 410a. The recording medium 90 arranged inside the accommodating case 400 can be protected by the film 61.

The invention claimed is:

1. An accommodating case for a portable recording medium, comprising:
    a medium disposition area defined on an inner surface of the accommodating case for disposing of the recording medium;
    a support portion formed inside the medium disposition area for supporting of the recording medium arranged in the medium disposition area;
    engagement portions for pinching opposing edges of the recording medium together with the support portion so that the recording medium is suppressed from separating from the inner surface; and
    a movable portion having: (i) a first end in hinged engagement within the medium disposition area so as to be beneath the recording medium when located within the medium disposition area, (ii) a second end, opposite to the first end, and movable between a resting position and a flexed position whereby the second end is rotated about the first end toward the outside of the accommodating case,
    wherein movement of the second end of the movable portion increases an opening simultaneously with the engagement portions pinching the opposing edges of the recording medium for at least a portion of a user's finger to be inserted within the opening and below the recording medium when located within the medium disposition area and to pull the recording medium away from the medium disposition area to release the engagement portions from pinching the edges of the recording medium, and
    wherein the support portion is positioned higher than the movable portion.

2. The accommodating case according to claim 1, wherein the movable portion includes an end connected to the support portion and is bent at the end toward a position lower than the support portion.

3. The accommodating case according to claim 1, wherein
    the movable portion is configured so as to incline around one end thereof toward the outside of the accommodating case,
    the one end is positioned inside the medium disposition area, and
    the other end which is positioned opposite to the one end is positioned outside the medium disposition area.

4. The accommodating case according to claim 1, wherein
    the movable portion includes a first part and a second part having a width greater than that of the first part, and
    at least a portion of the second part is located in the outside area of the medium disposition area.

5. The accommodating case according to claim 4, wherein
    the movable portion is configured so as to incline around an end of the first part toward the outside of the accommodating case, and
    the first part has an elongated shape extending from the end of the first part.

6. The accommodating case according to claim 1, wherein the engagement portions include:
    a first engagement portion and a second engagement portion extending toward the inside of the medium disposition area,
    the first engagement portion is formed so as to elastically deform to retreat from the medium disposition area, and
    the second engagement portion is restrained from retreating from the medium disposition area.

7. The accommodating case according to claim 1, wherein:
    the engagement portions are located opposite to each other across the medium disposition area, and
    two walls extending in a direction in which the two engagement portions face each other, wherein
    the accommodating case further includes two walls face each other in a direction orthogonal to the direction in which the engagement portions face each other and are positioned opposite to each other across the medium disposition area.

8. The accommodating case according to claim 7, further comprising: a peripheral wall including the two walls, which peripheral wall substantially surrounds the movable portion and the medium disposition area.

9. The accommodating case according to claim 1, wherein the engagement portions project toward the inside of the medium disposition area and are formed so that the recording medium is slidable in a direction parallel to the inner surface of the medium disposition area.

10. The accommodating case according to claim 9, wherein the engagement portions are restrained from moving in the retreating direction from the medium disposition area.

11. The accommodating case according to claim 9, wherein the movable portion includes a stopper for restricting the slide of the recording medium arranged in the medium disposition area.

12. The accommodating case according to claim 1, further comprising: a film covering an outer surface of the accommodating case.

13. The accommodating case according to claim 12, further comprising:
- a first panel having the inner surface in which the medium disposition area is provided, and
- a second panel opposite to the first panel when the accommodating case is closed, wherein
- two edges of the film located opposite to each other are attached to an outer surface of the first panel and an outer surface of the second panel, respectively, and
- a distance between the two edges of the film corresponds to a distance between an attachment position in the outer surface of the first panel and an attachment position in the outer surface of the second panel.

* * * * *